(12) United States Patent
Tanaka et al.

(10) Patent No.: US 7,387,700 B2
(45) Date of Patent: Jun. 17, 2008

(54) METHOD FOR PREPARING FILTERING MATERIAL

(75) Inventors: Osamu Tanaka, Settsu (JP); Kunihiko Inui, Settsu (JP); Yoshiyuki Shibuya, Settsu (JP); Hideyuki Kiyotani, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 263 days.

(21) Appl. No.: 10/473,803

(22) PCT Filed: Apr. 3, 2002

(86) PCT No.: PCT/JP02/00360

§ 371 (c)(1),
(2), (4) Date: Apr. 2, 2004

(87) PCT Pub. No.: WO02/081056

PCT Pub. Date: Oct. 17, 2002

(65) Prior Publication Data

US 2004/0168417 A1 Sep. 2, 2004

(30) Foreign Application Priority Data

Apr. 5, 2001 (JP) ............................. 2001-107765
Apr. 5, 2001 (JP) ............................. 2001-107766

(51) Int. Cl.
*B32B 37/00* (2006.01)
*B29C 65/00* (2006.01)

(52) U.S. Cl. .................... 156/308.2; 156/324; 55/485; 55/DIG. 5

(58) Field of Classification Search ............. 156/308.2, 156/324; 55/486, DIG. 5
See application file for complete search history.

(56) References Cited

U.S. PATENT DOCUMENTS

| 5,772,884 A | 6/1998 | Tanaka et al. |
| 6,027,553 A | 2/2000 | Hirano et al. |
| 6,143,675 A | 11/2000 | McCollam et al. |
| 6,214,093 B1 * | 4/2001 | Nabata et al. ................. 96/11 |

FOREIGN PATENT DOCUMENTS

| EP | 642922 A1 * | 3/1995 |
| EP | 830249 B1 | 3/1998 |
| EP | 0972559 | 1/2000 |
| EP | 970739 A | 2/2000 |

(Continued)

OTHER PUBLICATIONS

ChemicalLand21.com Publication.*

(Continued)

*Primary Examiner*—John L Goff
(74) *Attorney, Agent, or Firm*—Global IP Counselors

(57) ABSTRACT

A method of manufacturing a filter medium that has a PF value that exceeds 32, the PF value calculated from the pressure loss and the collection efficiency of the filter medium according to the following formula:

PF=[−log(permeability (%)/100)/(pressure loss (Pa)]×1000[Formula 1]

in which permeability (%)=100−collection efficiency (%). In this method, 380 ml or more of a liquid lubricant at 20° C. is added per 1 kg of a PTFE fine powder, this compound is processed into a tape shape and elongated to obtain a PTFE porous film, and an air permeable support member is heat laminated to at least one surface of the PTFE porous film.

3 Claims, 8 Drawing Sheets

FOREIGN PATENT DOCUMENTS

| | | |
|---|---|---|
| JP | 5-202217 | 8/1993 |
| JP | 6-218899 | 8/1994 |
| JP | 9-504737 | 5/1997 |
| JP | 10-30031 | 2/1998 |
| JP | 10-286415 A | 10/1998 |
| JP | 10-287759 A | 10/1998 |
| JP | 11-80397 A | 3/1999 |
| JP | 11-506987 A | 6/1999 |
| JP | 2000-79332 A | 3/2000 |
| JP | 2000-107526 A | 4/2000 |
| JP | 2000-300921 A | 10/2000 |
| JP | 2001-170424 A | 6/2001 |
| JP | 2001-170461 A | 6/2001 |
| WO | WO 94/16802 | 8/1994 |
| WO | WO 96/40510 A1 | 12/1996 |
| WO | WO 98/26860 | 6/1998 |

OTHER PUBLICATIONS

O. Tanaka et al., Technical revolution by ultra-high performan PTFE air filter, Proceedings of the 15th ICCCS International Symposium, published prior to Apr. 3, 2002, pp. 454-463.

* cited by examiner

Compression 134  135 136 137  139  141

METHOD FOR PREPARING FILTERING MATERIAL

TECHNICAL FIELD

The present invention relates to a filter medium that employs a porous film formed from polytetrafluoroethylene, a filter pack and an air filter unit that employs the same, and a method of producing a filter medium.

BACKGROUND ART

In recent years, the need for higher levels of cleanliness in clean rooms has increased in proportion to the degree in which semiconductors have been integrated and the capabilities of liquid crystals have improved, and thus air filter units having a higher particle collection efficiency are in demand.

Up until now, high performance air filters which are used in these types of air filter units, particularly HEPA (High Efficiency Particulate Air) filters, ULPA (Ultra Low Penetration Air) filters, and the like, are made by pleating a filter medium made of glass fibers in a wet paper forming process.

However, although the cost of the power needed to supply air from an air conditioner must be reduced, and it is desirable that the pressure loss of an air filter unit be reduced and the collection efficiency of the air filter unit be increased in order to achieve an even cleaner space, it is extremely difficult for an air filter unit formed from glass fibers to achieve higher levels of performance (higher collection efficiency if the pressure loss is the same, lower pressure loss if the collection efficiency is the same).

Accordingly, in order to produce an air filter unit having higher levels of performance, an air filter unit has been previously proposed which employs a porous film formed from polytetrafluoroethylene (hereinafter, PTFE) that has capabilities that are higher than a glass fiber medium. It has been reported that by employing a PTFE porous film, the pressure loss will be ⅔ that of an ULPA filter which employs a glass fiber medium having the same collection efficiency (Japanese unexamined patent application publication No. H05-202217, and PCT Publication Nos. WO94/16802 and WO98/26860).

In addition, although the capabilities of an air filter unit that employs a PTFE porous film can be further improved by the method used to produce or process the same, a PTFE porous film having improved capabilities has been previously proposed for use in this type of air filter unit. A simple high performance PTFE porous film (a filter medium that does not have an air permeable support member laminated thereto) is proposed in Japanese unexamined patent application publication H09-504737 (national phase of PCT application), Japanese unexamined patent application publication H10-30031, Japanese unexamined patent application publication H10-287759, and PCT Publication No. WO98/26860. These publications disclose a PTFE porous film having a high PF (Performance Factor) value (which indicates the capabilities of the filter medium). In addition, Japanese unexamined patent application publication H10-287759 discloses a PTFE porous film in which the highest PF value thereof was 32.

Up until now, it has been thought that the PF value of a PTFE porous film could be increased by reducing the diameter of the fibers in the PTFE porous film. However, according to the most recent research, even if the diameter of the fibers is reduced, there are limits to how much the PF value will be improved (O. Tanaka et al., Proceedings of the 15th ICCCS International Symposium, pp. 454-463). This is because when the diameter of the fibers of the PTFE porous film is reduced, the single fiber collection efficiency η of the film will indeed increase and exceed 1, but the actual single fiber collection efficiency η of the film will be lower than the calculated value of η due to interference from nearby fibers.

The cause of this will be explained with reference to this document (Proceedings of the 15th ICCCS International Symposium).

FIG. 15 shows the relationship between a fiber 61 in a conventional medium and particles 63 that are collected by the fiber 61, and FIG. 16 shows the relationship between fibers 71 that form a PTFE porous film and particles 73 that are collected by the fibers 71. In the figures, the diameter of the fibers 61, 71 that form the medium is df, and the width between particles positioned away from a fiber by a predetermined distance and collected thereby is de. In this situation, the single fiber collection efficiency η of the medium is expressed by:

$$\eta = d_e/d_f \qquad \text{[Formula 1]}$$

As shown in FIG. 15, in the conventional medium the fiber diameter $d_f$ is comparatively large and the simple fiber collection efficiency η is less than 1, however the simple fiber collection efficiency η of the PTFE porous film will be greater than 1 because the fiber diameter $d_f$ is much smaller.

Because of this, as shown in FIG. 16, the area S in which one fiber is capable of collecting particles partially overlaps with the area S' in which another nearby fiber is capable of collecting particles (i.e., the area P shown in the figure), and thus the collection efficiency per fiber, i.e., the single fiber collection efficiency η will decline.

The result, as noted above, is that the actual single fiber collection efficiency of the PTFE porous film as a whole will have a value that is smaller than the theoretical single fiber collection efficiency (the single fiber collection efficiency that does not take the reduction of the collection efficiency produced by interference from other fibers into consideration).

Thus, it has been difficult to increase the PF value because the actual single fiber collection efficiency of a medium is not expected to increase even if the diameter of the fibers of the medium are reduced, and although a PTFE porous film having a PF value of 32 is known in the prior art, a PTFE porous film having a PF value that exceeds 32 has not been known in the prior art up until now.

In addition, from a practical point of view, an air permeable support member must be laminated to the PTFE porous film in order to use the film as a filter medium. This is necessary, from the point of view of handling, in order to increase the strength of the PTFE porous film and to protect the medium from damage when the medium is processed into desired shapes. However, when an air permeable support member is laminated to the PTFE porous film, the PTFE porous film will be compressed in the thickness direction thereof, the distance between the fibers of the PTFE porous film will be reduced thereby, and as a result the actual η value will be further reduced, and the PF value of the PTFE porous film to which an air permeable member is laminated will be lower than the PF value of a PTFE porous film alone.

In fact, Japanese unexamined patent application publication No. H10-30031 discloses that when an air permeable support member is laminated to a PTFE porous film having a PF value of 26.6, the PF value thereof will become 19.8. In the prior art, PCT Publication No. WO98/26860 discloses that a medium formed from a PTFE porous film laminated to an air permeable support member has a PF value of 21.8, and the Proceedings of the 15th ICCCS International Symposium discloses that this combination has a PF value of 28. However, a medium that exceeds these PF values is not yet known in the prior art.

A first object of the present invention is to provide a high performance filter medium formed by laminating an air permeable support member to at least one side of a PTFE porous film, and in which a decline in the single fiber collection efficiency η of the filter medium after heat lamination is controlled, the pressure loss of the filter medium is low, and the collection efficiency of the filter medium is high. More specifically, for example, it is an object to provide a high performance filter medium formed by laminating an air permeable support member to at least one side of a PTFE porous film, and in which a decline in the single fiber collection efficiency q of the filter medium after heat lamination is controlled, the pressure loss of the filter medium is low, and the collection efficiency of the filter medium is high, such that the actual single fiber collection efficiency η of the filter medium is 80% of the calculated single fiber collection efficiency η thereof.

A second object of the present invention is to provide a filter pack formed from a pleated filter medium formed by laminating an air permeable support member to a PTFE porous film, the filter pack having low pressure loss and high collection efficiency.

A third object of the present invention is to provide an air filter unit in which a filter pack formed from a pleated filter medium formed by laminating an air permeable support member to a PTFE porous film is accommodated inside a frame, the air filter unit having low pressure loss and high collection efficiency.

A fourth object of the present invention is to provide an efficient method of manufacturing the aforementioned filters.

DISCLOSURE OF THE INVENTION

A filter medium in accordance with a first aspect of the present invention is formed from a porous film that is composed of PTFE, and an air permeable support member that is heat laminated to at least one surface of the porous film. The PF value of the filter medium exceeds 35, and is computed in accordance with the following formula from the pressure loss measured when air permeates the filter medium at a flow rate of 5.3 cm/s and the collection efficiency measured by employing silica particles having diameters between 0.10 and 0.12 micrometers.

$$PF=[-\log(\text{permeability }(\%)/100)/(\text{pressure loss (Pa)}]\times 1000; \quad \text{[Formula 2]}$$

in which permeability (%)=100−collection efficiency (%).

As noted above, a filter medium of this type which has a PF value of 28 is known in the prior art, but a filter medium of this type which has a PF value that exceeds 28 is not known in the prior art.

However, due to the research of the present inventors, it was discovered that PTFE porous film having a low packing ratio and a high porosity could be obtained by, for example, adding a predetermined proportion or greater of a liquid lubricant to a PTFE fine powder and producing a PTFE porous film therefrom.

The pressure loss for this type of PTFE porous film is lower than the pressure loss for conventional PTFE porous films, and the collection efficiency for this type of PTFE porous film is greatly improved because the collection function of the fibers therein will be actively displayed by not only the fibers on the surface layer of the film but also by the fibers in the interior of the film. Thus, this PTFE porous film will have a PF value that is sharply higher than the PF values of conventional PTFE porous films.

Accordingly, a high performance filter medium having a surprising and unexpected increase in PF value can be obtained by using this type of PTFE porous film as the filter medium.

A filter medium in accordance with a second aspect of the present invention is a filter medium, in which an air permeable support member is heat laminated to the outermost sides of both sides of the filter medium.

The air permeable support member, as noted above, is employed in order to stabilize the shape of the PTFE porous film and increase the ability of the PTFE porous film to be handled. However, in order to control damage to the fibers that form the PTFE porous film during the production of the filter pack and air filter unit noted below, it is preferable that the PTFE porous film is not exposed on the exterior of the filter medium.

Accordingly, laminating an air permeable support member to the outermost layers on both sides of this filter medium will control damage to the porous film.

According to this filter medium, even in a multi-layer filter medium in which a plurality of layers of PTFE porous film are laminated together, for example, damage to the PTFE porous film can be effectively controlled because an air permeable support member is laminated to the outermost layers thereof.

A filter medium in accordance with a third aspect of the present invention is a filter medium in accordance with the first or second aspects, in which the air permeable support member is formed from a heat fusible non-woven fabric.

In this filter medium, a portion of the air permeable support member is heat laminated to the PTFE porous film when the air permeable support member is heat laminated to the PTFE porous film. However, if this type of air permeable support member does not have an impact on the pressure loss of the filter medium, e.g., an air permeable support member that has a pressure loss that is substantially lower than the pressure loss of the PTFE porous film, then a conventional air permeable support member known in the prior art may be used to reinforce the PTFE porous film.

The air permeable support member is preferably a non-woven fabric in which at least the surface thereof has the ability to be heat laminated. More preferably, the air permeable support member is a non-woven fabric formed from core/sheath composite fibers (e.g., fibers in which the core is polyester and the sheath is polyethylene, or the core is high melt point polyester and the sheath is polyester).

A filter medium in accordance with a fourth aspect of the present invention is a filter medium in accordance with any of the first to third aspects, in which the molecular weight of the PTFE is 6,000,000 or greater.

The molecular weight of the PTFE is not particularly limited from the point of view of increasing the PF value. However, it is preferable to use a PTFE having a molecular weight of 6,000,000 or greater because when the molecular weight thereof is reduced, the ability of PTFE to be elongated will worsen, ruptures and a great deal of non-uniformity will be introduced into a manufactured PTFE porous film during elongation, and the like, and thus it will be commercially difficult to use as a filter.

A filter medium in accordance with a fifth aspect of the present invention is a filter medium in accordance with any of the first to fourth aspects, in which the packing ratio of the porous film is 8% or less.

As noted above, when the packing ratio of a PTFE porous film is large, the distance between the fibers thereof will decrease, the nearby fibers will cause interference, and the single fiber collection efficiency of a filter medium will be lower than the theoretical simple fiber collection efficiency thereof.

However, due to the research of the present inventors, it was discovered that the packing ratio decreased when a PTFE porous film was produced by means of the method noted above, and as a result, a PTFE porous film having large distances between the fibers therein could be obtained.

Accordingly, the packing ratio is intended to be lower than a predetermined value, here a packing ratio of 8% or less.

A filter medium in accordance with a sixth aspect of the present invention is a filter medium in accordance with any of the first to fifth aspects, in which the average diameter of the fibers that form the porous film is 0.1 micrometer or less.

As noted above, the PF value of a PTFE porous film will increase because the diameters of the fibers in a PTFE porous film are smaller than those in a conventional glass fiber medium, but on the other hand a PTFE porous film has characteristics that can be easily impacted, e.g., the single fiber collection ratio thereof can be reduced by a large packing ratio. These characteristics will be conspicuous as the PF value of the PTFE porous film increases.

Accordingly, the diameters of the fibers in the PTFE porous film are intended to be smaller than a predetermined level, and a filter medium that employs this type of PTFE porous film will have a high PF value.

A filter medium in accordance with a seventh aspect of the present invention is a filter medium in accordance with any of the first to sixth aspects, in which the PF value of the porous film exceeds 35.

As noted above, the PF value of a PTFE porous film will decrease when an air permeable support member is heat laminated thereto and processed into a filter medium. However, a filter medium in which the PF value thereof exceeds 35 will be obtained by employing a PTFE porous film having a PF value that is higher than the PF value of the filter medium.

A filter medium in accordance with an eighth aspect of the present invention is a filter medium in accordance with any of the first to seventh aspects, in which the actual single fiber collection efficiency η of the porous film is 80% or greater of the single fiber collection efficiency η calculated from the physical properties of the porous film.

As noted above, because the single fiber collection efficiency η of the PTFE porous film is greater than 1, the actual single fiber collection efficiency will be smaller than the theoretical single fiber collection efficiency due to the interference from nearby fibers.

However, as noted above, as a result of diligent research by the present inventors, it was discovered that the packing ratio of a PTFE porous film could be made smaller than that of conventional PTFE porous films, a PTFE porous film having large distances between the fibers thereof could be obtained, and the interference of nearby fibers could be reduced, by producing a PTFE porous film by, for example, mixing a predetermined proportion or greater of a liquid lubricant with a PTFE fine powder. In other words, it became clear that a PTFE porous film in which the actual single fiber collection efficiency thereof is 80% or greater of the calculated single fiber collection efficiency could be obtained by means of this method of production.

Accordingly, a high performance filter medium in which the amount of decline in the single fiber collection efficiency thereof is controlled better than that of a conventional PTFE porous film is obtained by using this type of PTFE porous film as the filter medium.

Note that in the present invention, the physical properties of the porous film are defined by the various values relating to the PTFE porous film shown in Formula 10 (described below).

A filter medium in accordance with a ninth aspect of the present invention is a filter medium in accordance with any of the first to eighth aspects, in which the filter medium is employed in an air filter unit in which the collection efficiency for particles having diameters of 0.3 micrometers or greater is 99.97% or greater, and the pressure loss is between 50 Pa and 500 Pa, when air permeates the filter medium at a rate of 1.4 cm/second.

An air filter unit having these characteristics will generally qualify as a HEPA filter, and in recent years the need for air filter units that are suitable for use in a space that must have a high degree of cleanliness is increasing. A filter medium which employs the high performance PTFE porous film noted above is suitable for use as an HEPA filter.

Accordingly, a filter medium employing this type of PTFE porous film is capable of being used as a HEPA filter.

A filter medium in accordance with a tenth aspect of the present invention is a filter medium in accordance with any of the first to ninth aspects, in which the filter medium is employed in an air filter unit in which the collection efficiency for particles having diameters of 0.1 micrometers or greater is 99.9999% or greater, and the pressure loss is between 50 Pa and 500 Pa, when air permeates the filter medium at a rate of 1.4 cm/second.

An air filter unit having these characteristics will generally qualify as a ULPA filter, and is suitable for use in a space that must have a degree of cleanliness that is even higher than that of a HEPA filter. A filter medium which employs the high performance PTFE porous film noted above is suitable for use as an HEPA filter.

Accordingly, a filter medium employing this type of PTFE porous film is capable of being used as a ULPA filter.

A filter pack in accordance with an eleventh aspect of the present invention includes a filter medium in accordance with any of the first to tenth aspects that has been processed into a predetermined shape.

The filter medium is processed into a predetermined shape, such as a pleated shape, in order for it to be employed in the air filter unit.

A filter pack in accordance with a twelfth aspect of the present invention includes a filter medium and spacers. The filter medium is a filter medium in accordance with any of the first to tenth aspects that has been pleated. The spacers are formed from a polyamide hot melt resin, and serve to maintain the filter medium in a pleated shape.

In order to be employed in an air filter unit, a filter medium is normally pleated and provided with spacers in order to maintain the gaps between the pleats pleated. Here, however, a high performance filter pack can be obtained because the aforementioned high performance filter medium is employed. As noted below, pleating is defined as sequentially folding a filter medium to form a pleated shape (or a folded shape).

An air filter unit in accordance with a thirteenth aspect of the present invention includes the filter medium in accordance with the eleventh or twelfth aspects, and a frame in which the filter pack is accommodated.

A filter pack is accommodated inside a predetermined frame and processed into an air filter unit. However, a high performance air filter unit can be obtained because the aforementioned high performance filter pack is employed.

A method of producing a filter medium in accordance with a fourteenth aspect of the present invention is a method of production, in which the filter medium is formed from a porous film composed of PTFE and an air permeable support member that is heat laminated onto at least one surface of the porous film, the film medium having a PF value that exceeds 32, and the PF value of the film medium is computed in accordance with the following formula from pressure loss that is measured when air is permeated through the filter medium at a flow rate of 5.3 cm/s and collection efficiency is measured by using silica particles having diameters between 0.10 and 0.12 micrometers.

$$PF=[-\log(\text{permeability (\%)}/100)/(\text{pressure loss (Pa)}]\times 1000 \quad \text{Formula 3}$$

(Here, permeability (%)=100−collection efficiency (%)).

This method of production includes a first step, a second step, a third step and a fourth step. In the first step, 380 ml or more of a liquid lubricant at 20° C. is added per 1 kg of a PTFE fine powder to obtain a compound. Note that in the present invention, the amount of liquid lubricant is the amount thereof at 20° C. In the second step, the compound is rolled, and the liquid lubricant is then removed therefrom to obtain a non-sintered tape. In the third step, the non-sintered tape is elongated to obtain a porous film. In the fourth step, an air permeable support member is heat laminated to at least both sides of the porous film.

As noted above, recent research of the present inventors has made clear that there are limits to the degree in which the PF value of a PTFE porous film can be increased, even if the diameters of the fibers of the porous film are reduced.

As a result of diligent research by the present inventors, it has been discovered that a PTFE porous film having a high PF value and not found in the prior art could be obtained by a method which includes the steps of adding 380 ml or more of a liquid lubricant at 20° C. per 1 kg of a PTFE fine powder, extruding this paste, rolling a PTFE sheet from this paste and then drying the liquid lubricant therefrom to produce a non-sintered PTFE sheet, elongating the non-sintered PTFE sheet in the longitudinal direction, and then elongating this sheet in the lateral direction.

In the production of the PTFE porous film, a liquid lubricant is mixed with a PTFE fine powder in order to maintain the non-melt processability of the PTFE porous film. However, the results of the research by the present inventors up until now have made it clear that if the amount of liquid lubricant mixed with the PTFE fine powder is increased, but the other parameters in the production of the PTFE porous film are the same as those in the prior art, the pressure loss of the porous film will be reduced. The reasons for this were investigated further, and the results turned out to be as follows. In other words, when a large amount of liquid lubricant is mixed with the PTFE fine powder, the stress applied to the PTFE fine powder during paste extrusion and rolling will be reduced, and the points at which fibers are produced from the PTFE fine powder will be reduced. As a result, when a non-sintered tape having a large quantity of liquid lubricant therein is elongated, the amount of fibers generated will be reduced and the porosity of the porous film will increase, i.e., the packing ratio of the porous film will be reduced. It was discovered that this was the reason for the reduction in the pressure loss. At the same time, it was discovered that the PF value of the PTFE porous film increased. Thus, according to the method of production according to the present invention, it became clear that a filter medium whose PF value exceeded 32 could be obtained even after an air permeable support member is heat laminated to the PTFE porous film.

The reason that the PF value of the filter medium obtained by the method of production of the present invention increases is as follows. According to the single fiber collection theorem, when the packing ratio grows larger, the particle collection efficiency and the PF value of a porous film will generally increase due to the screening mechanism. However, when actually measured, the PF value will increase when the packing ratio is reduced. The reason for this is as follows. According to the Proceedings of the 15th ICCCS International Symposium, because the distance between the fibers of a PTFE porous film becomes smaller when the packing ratio thereof increases, a PTFE porous film in which the diameters of the fibers are reduced and the single fiber collection efficiency η exceeds 1 will have interference generated from nearby fibers, and thus the actual single fiber collection efficiency of the film will be smaller than the single fiber collection efficiency q that the fibers themselves possess. Conversely, when the packing ratio is reduced and the distance between the fibers is increased, the interference area of the nearby fibers will be reduced, and the single fiber collection efficiency η that the fibers themselves possess will be exhibited as is.

Thus, the PTFE porous film of the present invention will control the decline in the actual single fiber collection efficiency η, will have a PF value that exceeds 32, and moreover, as described below, will have a PF value that exceeds 35.

In addition, as noted above, when an air permeable support member is to be heat laminated to the PTFE porous film, the PTFE porous film and the air permeable support member are passed between two rollers, at least one of which is heated, according to normal methods. This method will compress the film in the thickness direction, the loss in single fiber collection efficiency η will increase, and the PF value of the medium will decline.

Accordingly, in the present invention, in order to control the decline in the PF value of a high PF value PTFE porous film, heat lamination is conducted such that compression of the PTFE porous film in the thickness direction can be avoided as much as possible, and a filter medium having a high PF value is obtained thereby. For example, Japanese unexamined patent application publication H06-218899 discloses a method in which a PTFE porous film and an air permeable support member are placed on top of each other and laminated by means of their own weight and without the application of additional pressure. This publication also discloses a method of weakening take-up tension.

A method of producing a filter medium in accordance with a fifteenth aspect of the present invention is the method of production of the fourteenth aspect, in which in the first step thereof, 406 ml or more of a liquid lubricant at 20° C. is added per each 1 kg of PTFE fine powder.

As noted above, due to research by the present inventors, it was discovered that a PTFE porous film having a low packing ratio can be obtained by increasing the amount of liquid lubricant that is mixed per unit weight of PTFE fine powder. However, it became clear that it is more preferable that 406 ml or more of a liquid lubricant at 20° C. be added per each 1 kg of PTFE fine powder.

Accordingly, in this method of production, a filter medium in which the packing ratio is further reduced and the PF value is further increased is obtained by adding this amount of liquid lubricant to a PTFE fine powder.

A method of producing a filter medium in accordance with a sixteenth aspect of the present invention is the method of production of the fourteenth or fifteenth aspects, in which in the third step, the total area of the non-sintered tape is elongated to between 80 times and 800 times its original size by first elongating the non-sintered tape in the longitudinal direction between 3 times and 20 times its original length and then elongating the non-sintered tape in the lateral direction between 10 and 50 times its original width.

In this method of production, when the non-sintered PTFE tape is elongated, a filter medium composed of a high performance PTFE porous film is obtained by elongating the PTFE tape at these draw ratios.

A method of producing a filter medium in accordance with a seventeenth aspect of the present invention is the method of production of any of the fourteenth to sixteenth aspects, in which the air permeable support member is a heat fusible non-woven fabric.

In this method of production, a high performance filter medium is obtained when a heat fusible non-woven fabric is employed as the air permeable support member.

A filter medium in accordance with an eighteenth aspect of the present invention is the filter medium of the first aspect, in which the porous film is a multi-layer porous film having at least two layers. The multi-layer porous film includes a first porous film composed of PTFE, and a second porous film that is composed of modified PTFE and laminated to the first porous film.

As noted above, a filter medium of this type which has a PF value of 28 is known in the prior art, but a filter medium of this type which has a PF value that exceeds 28 is not known in the prior art. This is because, according to the single fiber collection theorem, a filter medium in which the diameters of the fibers therein have been reduced and the single fiber collection efficiency q thereof exceeds 1 will have interference produced therein by nearby fibers, and thus the actual single fiber collection efficiency η of the filter medium will be lower than the single fiber collection efficiency η that the fibers themselves have.

However, the results of the research by the inventors show that, a PTFE porous film having a PF value that is higher than previously known in the prior art is obtained by, for example, a multi-layer porous film having at least two layers in which a homo-PTFE porous film and a modified PTFE porous film are laminated to each other. In other words, it was discovered that the distance between the fibers of a PTFE porous film can be increased by means of the method of production noted below, and as a result, interference from nearby fibers will be controlled, and a porous film having a PF value higher than that found in the prior art will be obtained.

The reason why the multi-layer porous film according to the present invention has a high PF value will be explained below.

The ability of modified PTFE to be elongated is poor, and when used alone will rupture during the lateral elongation conducted in the last step of the porous film production method. Thus, a porous film to be used as an air filter cannot be obtained. However, when this modified PTFE is placed on homo-PTFE, the lateral elongation of the final step can be carried out without ruptures occurring.

More specifically, because the ability of modified PTFE to be elongated is poor, the structure of a multi-layer porous film that employs modified PTFE will, in contrast to the fine structure of homo-PTFE, have a net-like pattern with pores having extremely large diameters. The porous structure on the surface of the modified PTFE porous film will have a substantial impact on the homo-PTFE porous film (the particle collection layer). In other words, in the interface between the homo-PTFE and the modified PTFE, the homo-PTFE porous film will be pulled by movement that attempts to widen the diameter of the pores to the size of the net-like pattern of the modified PTFE. As a result, the structure of the homo-PTFE porous film in the interface between it and the modified PTFE porous film will have pores therein that are larger than the pores in the internal structure of the homo-PTFE porous film, and thus the distance between the fibers will increase.

On the other hand, the particles that are collected by a PTFE porous film are collected on the surface of the porous film structure by means of a PTFE porous film having high collection capabilities. However, for the aforementioned reasons, the decline in the single fiber collection efficiency η of the fibers of the homo-PTFE porous film on the surface thereof due to interference from the nearby fibers will decrease, and as a result, the PF value of the porous film will increase.

A multi-layer PTFE porous film having this type of multi-layer structure will have a lower rate of increase in pressure loss due to particle adhesion than a single layer PTFE porous film. In this type of multi-layer porous film, it is generally thought that the increase in pressure loss will be reduced by capturing comparatively large particles in the layer having a wide mesh, and capturing comparatively small particles in the layer having a narrow mesh.

However, when filters such as HEPA and ULPA are used in super clean rooms in the semiconductor industry, an increase in pressure loss cannot be controlled for the aforementioned reasons because large particles in super clean rooms are removed in advance by a pre-filter or the like.

With respect to this point, in the multi-layer porous film of the present invention, the interface area of the homo-PTFE porous film will be roughened by the modified PTFE porous film. The reason that the pressure loss of the PTFE porous film will increase due to the adherence of particles thereto is thought to be due to the fact that the particles accumulate in a layer on the surface of the porous film and form a cake layer thereon, and not because the particles accumulate in the interior of the porous film and cause clogging.

According to the multi-layer PTFE porous film of the present invention, it will be difficult for a cake layer to form due to particle adherence because the surface of the homo-PTFE porous film (the particle collection layer) is roughened.

In addition, as noted above, when an air permeable support member is to be heat laminated to the PTFE porous film, the PTFE porous film and the air permeable support member are passed between two rollers, at least one of which is heated, according to normal methods. This method will compress the film in the thickness direction, the loss in single fiber collection efficiency η will increase, and the PF value of the medium will decline.

Accordingly, in this filter medium, in order to control the decline in the PF value of a high PF value PTFE porous film, heat lamination is conducted such that compression of the PTFE porous film in the thickness direction can be avoided as much as possible, and a filter medium having a high PF value is obtained thereby. For example, Japanese unexamined patent application publication H06-218899 discloses a method in which a PTFE porous film and an air permeable support member are placed on top of each other and laminated by means of their own weight and without the application of additional pressure. This publication also discloses a method of weakening take-up tension.

A filter medium in accordance with a nineteenth aspect of the present invention is the filter medium of the first aspect, in which the porous film is a multi-layer porous film having at least two layers. The multi-layer porous film includes a first porous film, and a second porous film that is laminated on the first porous film and has an average pore diameter that is 10 times or greater than the average pore diameter of the first porous film.

In this filter medium, a plurality of porous films that have different average pore diameters and which have been laminated together are employed as the multi-layer porous film, and the first porous film that has the smaller average pore diameter functions as the main collection layer.

When this type of multi-layer film is elongated in the final step of the porous film production method, the interface area of the first porous film that is in contact with the second porous film will have a fine structure before elongation. However, when the first and second porous films are elongated together, a force that attempts to enlarge and widen the interface area of the first porous film will be applied thereto by the second porous film having the large average pore diameter (e.g., a net-like structure), and thus the interface area of the first porous film will be pulled by the second porous film and take on an enlarged, widened and roughened structure. As a result, the structure of the interface area of first porous film will have a structure that is larger than the fine structure in the interior thereof.

Because of this, the distance between the fibers of the interface area of the first porous film in this multi-layer film will become larger, and as a result, interference from nearby fibers will not be produced and the decline in the single fiber collection efficiency will be controlled. Thus, the PF value of the multi-porous film will sharply increase.

In addition, a multi-layer porous film is obtained in which particles in the air are collected by both the interface area of the first porous film and by the fibers in the interior of the first porous film. Because of this, particles do not accumulate in the interface area of the first porous film and form a cake layer like in the prior art, and as a result, a rise in the pressure loss will be controlled.

Note that the average pore diameter of the second porous film is preferably 50 times or greater that of the first porous film, and more preferably 100 times or greater that of the first porous film.

A filter medium in accordance with a twentieth aspect of the present invention is the filter medium of the nineteenth aspect, in which the first porous film is formed from a homo-PTFE and the second porous film is formed from a modified PTFE.

As noted above, due to the research of the present inventors, it was discovered that in a multi-layer porous film that includes a homo-PTFE porous film and a modified PTFE porous film, the interface area of the homo-PTFE porous film will be pulled apart during elongation by the movement of the modified porous film having the large average pore diameter, and the distance between the fibers in the interface area of the homo-PTFE will widen and increase. In addition, it was clearly shown as a result thereof that interference from nearby fibers will not be produced, the decline in the single fiber collection efficiency will be controlled, and the PF value of the multi-porous film will sharply increase.

Here, a high performance filter medium having a surprising and unexpected increase in PF value is obtained by heat laminating a multi-layer porous film that includes a homo-PTFE porous film and a modified PTFE porous film to an air permeable support member.

Up until now, only a PTFE porous film having a PF value of 28 after an air permeable support member was heat laminated thereto was known in the prior art. However, a filter medium having a PF value that exceeds 32 can be obtained by employing a multi-layer porous body that includes homo-PTFE and modified PTFE having different average pore diameters like that noted above.

A filter medium in accordance with a twenty-first aspect of the present invention is the filter medium of the twentieth aspect in which the modified PTFE is one in which only enough of a co-monomer is added to a TFE monomer to render the TFE monomer non-melt processable.

The modified PTFE fine powder employed as the modified PTFE in the present invention is one in which a small amount of a co-monomer is added to a TFE monomer and copolymerized together. The amount of co-monomer added is generally 0.01 to 0.03 wt %.

When this amount of co-monomer is added, the modified PFFE fine powder cannot be melt processed and is maintained in a non-melt processable state.

A filter medium in accordance with a twenty-second aspect of the present invention is the filter medium of the twenty-first aspect, in which the co-monomer is one or more types selected from the group consisting of hexafluoropropylene, perfluoroalkyl vinyl ether, perfluoropropyl vinyl ether, and trifluorochloroethylene.

The copolymer units are preferably hexafluoropropylene, perfluoroalkyl vinyl ether, perfluoropropyl vinyl ether, trifluorochloroethylene, and the like. More specifically, these materials are desirable when used as co-monomers.

A filter medium in accordance with a twenty-third aspect of the present invention is the filter medium of any of the nineteenth to twenty-second aspects, in which the air permeable support member is heat laminated to the outermost sides of both sides of the filter medium.

The air permeable support member, as noted above, is employed in order to stabilize the shape of the PTFE porous film and increase the ability of the PTFE porous film to be handled. However, in order to control damage to the fibers that form the PTFE porous film during the production of the filter pack and air filter unit noted below, it is preferable that the PTFE porous film is not exposed on the exterior of the filter medium.

Accordingly, laminating an air permeable support member to the outermost layers on both sides of this filter medium will control damage to the porous film.

According to this filter medium, even in a multi-layer filter medium in which a plurality of layers of PTFE porous film are laminated together, for example, damage to the PTFE porous film can be effectively controlled because an air permeable support member is laminated to the outermost layers thereof.

A filter medium in accordance with a twenty-fourth aspect of the present invention is the filter medium of any of the nineteenth to twenty-third aspects, in which the air permeable support member is composed of a heat fusible non-woven fabric.

In this filter medium, a portion of the air permeable support member is heat laminated to the PTFE porous film when the air permeable support member is heat laminated to the PTFE porous film. However, if this type of air permeable support member does not have an impact on the pressure loss of the filter medium, e.g., an air permeable support member that has a pressure loss that is substantially lower than the pressure loss of the PTFE porous film, then a conventional air permeable support member known in the prior art may be used to reinforce the PTFE porous film.

The air permeable support member is preferably a non-woven fabric in which at least the surface thereof has the ability to be heat laminated. More preferably, the air permeable support member is a non-woven fabric composed of core/sheath composite fibers (e.g., fibers in which the core is polyester and the sheath is polyethylene, or the core is high melt point polyester and the sheath is polyester).

A filter medium in accordance with a twenty-fifth aspect of the present invention is the filter medium set forth in any of the nineteenth to twenty-fourth aspects, in which the multi-layer porous film further includes a third porous film that is laminated to a side of the first porous film that is opposite side that the second porous film is laminated to, and in which the average pore diameter of the third porous film is 10 times or greater of the average pore diameter of the first porous film.

The multi-layer PTFE porous film of the present invention is not limited to a two-layer structure, but may also have a structure having three or more layers that that illustrated here. If the multi-layer PTFE porous film has a three layer structure, the aforementioned effects will be demonstrated even if the middle layer is the homo-PTFE porous film and the outer layer is the modified PTFE porous film, or the middle layer is the modified PTFE porous film and the outer layer is the homo-PTFE porous film.

A filter medium in accordance with a twenty-sixth aspect of the present invention is the filter medium of any of the nineteenth to twenty-fifth aspects, in which the filter medium is employed in an air filter unit in which the collection efficiency for particles having diameters of 0.3 micrometers or greater is 99.97% or greater, and the pressure loss is between 50 Pa and 500 Pa, when air permeates the filter medium at a rate of 1.4 cm/second.

An air filter unit having these characteristics will generally qualify as a HEPA filter, and in recent years the need for air filter units that are suitable for use in a space that must have a high degree of cleanliness is increasing. A filter medium which employs the high performance PTFE porous film noted above is suitable for use as an HEPA filter.

Accordingly, a filter medium employing this type of PTFE porous film is capable of being used as a HEPA filter.

A filter medium in accordance with a twenty-seventh aspect of the present invention is the filter medium of any of the nineteenth to twenty-sixth aspects, in which the filter medium is employed in an air filter unit in which the collection efficiency for particles having diameters of 0.1 micrometers or greater is 99.9999% or greater, and the pressure loss is between 50 Pa and 500 Pa, when air permeates the filter medium at a rate of 1.4 cm/second.

An air filter unit having these characteristics will generally qualify as a ULPA filter, and is suitable for use in a space that must have a degree of cleanliness that is even higher than that of a HEPA filter. A filter medium which employs the high performance PTFE porous film noted above is suitable for use as an HEPA filter.

Accordingly, a filter medium employing this type of PTFE porous film is capable of being used as a ULPA filter.

A filter medium in accordance with a twenty-eighth aspect of the present invention is the filter medium of any of the nineteenth to twenty-seventh aspects, in which the PF value of the multi-layer porous film exceeds 35.

As noted above, the PF value of a PTFE porous film will decrease when an air permeable support member is heat laminated thereto and processed into a filter medium. However, a filter medium in which the PF value thereof exceeds 35 will be obtained by employing a PTFE porous film having a PF value that is higher than the PF value of the filter medium.

A filter pack in accordance with a twenty-ninth aspect of the present invention includes a filter medium in accordance with of any of the nineteenth to twenty-eighth aspects that has been processed into a predetermined shape.

The filter medium is processed into a predetermined shape, such as a pleated shape, in order for it to be employed in the air filter unit.

A filter pack in accordance with a thirtieth aspect of the present invention includes a filter medium and spacers. The filter medium is a filter medium in accordance with of any of the nineteenth to twenty-eighth aspects that has been pleated. The spacers are composed of a polyamide hot melt resin, and serve to maintain the filter medium in a pleated shape.

In order to be employed in an air filter unit, a filter medium is normally pleated and provided with spacers in order to maintain the gaps between the pleats. Here, however, a high performance filter pack can be obtained because the aforementioned high performance filter medium is employed. As noted below, pleating is defined as sequentially folding a filter medium to form a pleated shape (or a folded shape).

An air filter unit in accordance with a thirty-first aspect of the present invention includes an air filter pack and a frame. The filter pack is the filter pack in accordance with the twenty-ninth or thirtieth aspects. The frame accommodates the filter pack.

A filter pack is accommodated inside a predetermined frame and processed into an air filter unit. However, a high performance air filter unit can be obtained because the aforementioned high performance filter pack is employed.

A method of producing a filter unit in accordance with a thirty-second aspect of the present invention is a method of producing a filter medium composed of a multi-layer porous film having at least two layers, and an air permeable support member that is heat laminated to at least one surface of the multi-layer porous film. The multi-layer porous film includes a first porous film that is formed from homo-PTFE and a second porous film that is formed from a modified PTFE. This method of production includes a first step, a second step, a third step, a fourth step, fifth step, and a sixth step.

In the first step, a first mixture is made by mixing a homo-PTFE fine powder with a liquid lubricant and a second mixture is made by mixing a modified PTFE fine powder with a liquid lubricant. These compounds are placed separately inside a cylindrical extrusion mold. In the second step, the first and the second mixtures are unitarily paste extruded. In the third step, the first and the second mixtures from the second step are compressed together to obtain a multi-layer formation. In the fourth step, the liquid lubricant is removed from the multi-layer formation to obtain a non-sintered tape. In the fifth step, the non-sintered step is elongated first in the longitudinal direction and then in the lateral direction to obtain a multi-layer porous film. In the sixth step, an air permeable support member is heat laminated to at least one side of the multi-layer porous film.

Due to research by the present inventors, it was discovered that the multi-layer porous film noted above is obtained, in one method, by separately placing a homo-PTFE fine power and a modified PTFE fine power inside a cylindrical extrusion mold, paste extruding these compounds, compressing the compounds together, removing the liquid lubricant therefrom, and then elongating the compounds in the longitudinal direction and in the lateral direction.

Here, a high performance filter medium can be efficiently obtained by obtaining a multi-layer porous film by means of this method, and then heat laminating an air permeable sheet thereto.

A method of producing a filter medium in accordance with a thirty-third aspect of the present invention is a method of producing a filter medium composed of a multi-layer porous film having at least two layers, and an air permeable support member that is heat laminated to at least one surface of the multi-layer porous film. The multi-layer porous film includes a first porous film that is formed from homo-PTFE and a second porous film that is formed from a modified PTFE. This method of production includes a first step, a second step, a third step, a fourth step, fifth step, and a sixth step.

In the first step, a first mixture is made by mixing a homo-PTFE fine power with a liquid lubricant and a second mixture is made by mixing a modified PTFE fine power with a liquid lubricant. These compounds are each paste extruded. In the second step, the first mixture from the first step is compressed to obtain a first formation, and the second mixture from the first step is compressed to obtain a second formation. In the third step, the liquid lubricants in the first and the second mixtures are removed therefrom. In the fourth step, the first and the second formations from the third step are placed on top of each other to obtain a non-sintered tape. In the fifth step, the non-sintered step is elongated first in the longitudinal direction and then in the lateral direction to obtain a multi-layer porous film. In the sixth step, an air permeable support member is heat laminated to at least one side of the multi-layer porous film.

Due to the research by the present inventors, it was discovered that the multi-layer film described above is obtained, in one method, by separately paste extruding homo-PTFE fine powder and a modified PTFE fine powder, and after compressing these formations and removing the liquid therefrom, the formations are placed on top of each other and elongated in the longitudinal direction and in the lateral direction. In the second step, the first mixture from the first step is compressed to obtain a first formation, and the second mixture from the first step is compresses to obtain a second formation. In the third step, the liquid lubricants in the first and the second components are removed therefrom. In the fourth step, the first and the second formations from the third step are placed on top of each other to obtain a non-sintered tape. In the fifth step, the non-sintered step is elongated first in the longitudinal direction and then in the lateral direction to obtain a multi-layer porous film. In the sixth step, an air permeable support member is heat laminated to at least one side of the multi-layer porous film.

Here, a high performance filter medium can be efficiently obtained by obtaining a multi-layer porous film by means of this method, and then heat laminating an air permeable sheet thereto.

A method of producing a filter medium in accordance with a thirty-fourth aspect of the present invention is a method of producing a filter medium composed of a multi-layer porous film having at least two layers, and an air permeable support member that is heat laminated to at least one surface of the multi-layer porous film. The multi-layer porous film includes a first porous film that is formed from homo-PTFE and a second porous film that is formed from a modified PTFE. This method of production includes a first step, a second step, a third step, a fourth step, fifth step, and a sixth step.

In the first step, a first mixture is made by mixing a homo-PTFE fine power with a liquid lubricant and a second mixture is made by mixing a modified PTFE fine power with a liquid lubricant. These compounds are each paste extruded. In the second step, the first mixture from the first step is compressed to obtain a first formation, and the second mixture from the first step is compressed to obtain a second formation. In the third step, the liquid lubricants in the first and the second mixtures are each removed therefrom to obtain two non-sintered tapes. In the fourth step, the two non-sintered tapes are each elongated in the longitudinal direction. In the fifth step, the two non-sintered tapes elongated in the longitudinal direction are placed on top of each other, and then are elongated in the lateral direction to obtain a multi-layer porous film. In the sixth step, an air permeable support member is heat laminated to at least one side of the multi-layer porous film.

Due to the research by the present inventors, it was discovered that the multi-layer film described above is obtained, in one method, by separately paste extruding homo-PTFE fine powder and a modified PTFE fine powder, and after compressing these formations, removing the liquid therefrom, and elongating them in the longitudinal direction, the non-sintered tapes produced thereby are placed on top of each other and elongated in the lateral direction.

Here, a high performance filter medium can be efficiently obtained by obtaining a multi-layer porous film by means of this method, and then heat laminating an air permeable sheet thereto.

A method of producing a filter medium in accordance with a thirty-fifth aspect of the present invention is any of the methods of production of the thirty-second to thirty-fourth aspects, in which the total area of the non-sintered tape is elongated to between 80 times and 800 times its original size by first elongating the non-sintered tape in the longitudinal direction between 3 times and 20 times its original length and then elongating the non-sintered tape in the lateral direction between 10 and 50 times its original width.

In this method of production, when the non-sintered PTFE tape is elongated, a filter medium composed of a high performance PTFE porous film is obtained by elongating the PTFE tape at these draw ratios.

A method of producing a filter medium in accordance with a thirty-sixth aspect of the present invention is the method of production of any of the thirty-second to thirty-fifth aspects, in which the air permeable support member is composed of a heat fusible non-woven fabric.

In this method of production, a high performance filter medium is obtained when a heat fusible non-woven fabric is employed as the air permeable support member.

BEST MODE FOR CARRYING OUT THE INVENTION

First Embodiment

[Filter Medium]

Figure 1:
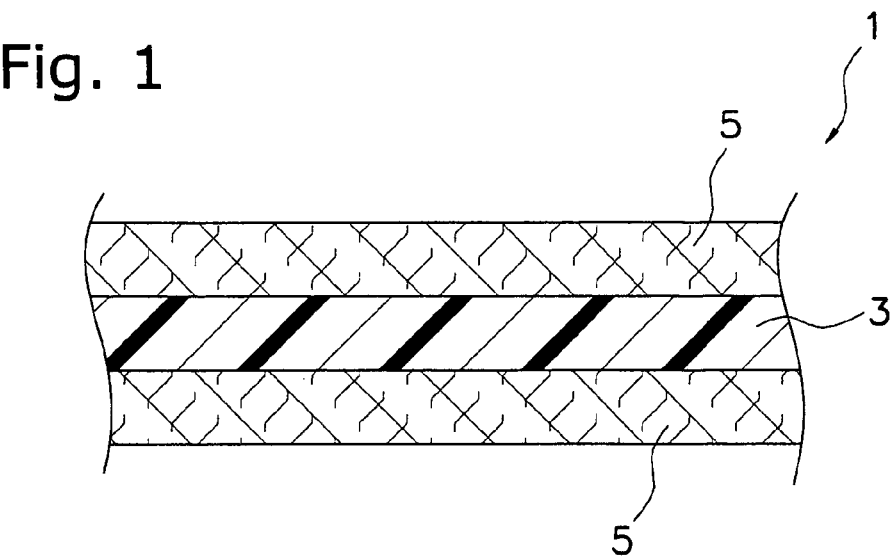
FIG. 1 is a cross-section of a filter medium which employs a first embodiment of the present invention.

FIG. 1 shows a filter medium 1 which employs a first embodiment of the present invention.

The filter medium 1 includes a porous film 3 composed of PTFE, and air permeable support members 5 that are heat laminated to both surfaces of the PTFE porous film.

The molecular weight of the PTFE employed as the material of the PTFE porous film 3 is 6,000,000 or greater. The PTFE porous film 3 is obtained by means of a method of producing a filter medium described below, and the actually measured single fiber collection efficiency η of the PTFE porous film 3 (calculated by Formula 11 described below) is 80% or greater of the calculated single fiber collection efficiency η thereof (calculated by Formula 10 described below).

The PTFE porous film has a packing ratio of 8% or less, and the average fiber diameter of the fibers that form the PTFE porous film 3 is 0.1 micrometer or less. In addition, the thickness of the PTFE porous film is 50 micrometers or less, and preferably 1 to 30 micrometers.

The PF value of the PTFE porous film 3 having this type of structure will exceed 35. In addition, the PTFE porous film 3 is not limited to a single sheet, but may have a multi-layer structure such as a plurality of layers placed on top of each other, or a plurality of porous films 3 laminated to a plurality of air permeable support members 5.

Furthermore, the PTFE porous film 3 may have a multi-layer structure in which different types of PTFE porous films are combined together, such as a multi-layer structure having, for example, a homo-PTFE porous film and a modified PTFE porous film.

The air permeable support member 5 is composed of a non-woven fabric that is heat fusible. The air permeable support members 5 are laminated to both surfaces of the PTFE porous film 3 in the present embodiment, but may be laminated to only one surface thereof. In addition, when the PTFE porous film 3 is a multi-layer structure, the air permeable support members 5 are preferably laminated to the outermost layers of this multi-layer structure in order to prevent damage to the fibers of the porous film during heat lamination.

A filter medium 1 having this type of structure will have a PF value that exceeds 32, the PF value computed in accordance with the following formula from the pressure loss when air permeates the filter medium at a flow rate of 5.3 cm/s and silica particles having diameters between 0.10 and 0.12 micrometers were employed to measure the collection efficiency of the filter medium.

$$PF = [-\log(\text{permeability}(\%)/100)/(\text{pressure loss (Pa)}] \times 1000 \quad \text{[Formula 4]}$$

(Here, permeability (%)=100−collection efficiency (%))

In addition, the filter medium 1 can be employed in a high performance air filter unit such as a HEPA filter (an air filter unit in which the collection efficiency for particles having diameters of 0.3 micrometers or greater is 99.97% or greater, and the pressure loss is between 50 Pa and 500 Pa when air permeates the filter medium at a rate of 1.4 cm/second), a ULPA filter (an air filter unit in which the collection efficiency for particles having diameters of 0.1 micrometers or greater is 99.9999% or greater, and the pressure loss is between 50 Pa and 500 Pa when air permeates the filter medium at a rate of 1.4 cm/second), or the like.

[Air Filter Unit]

Figure 2:
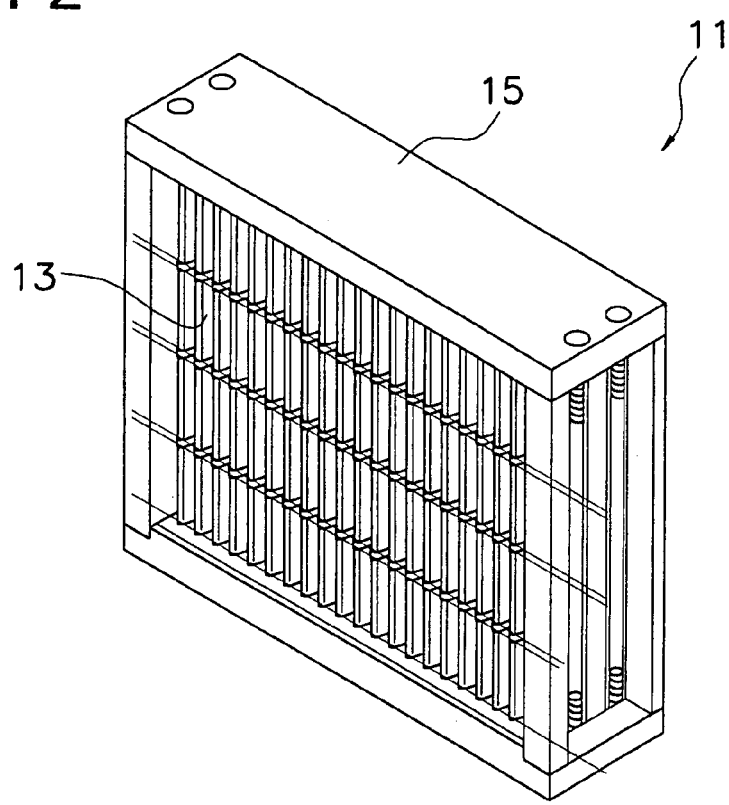
FIG. 2 is a perspective view of an air filter unit which employs the first embodiment of the present invention.

FIG. 2 shows an air filter unit which employs a first embodiment of the present invention.

The air filter unit 11 is composed of a filter pack 13, and a frame 15 that accommodates the filter pack 13.

Figure 3:
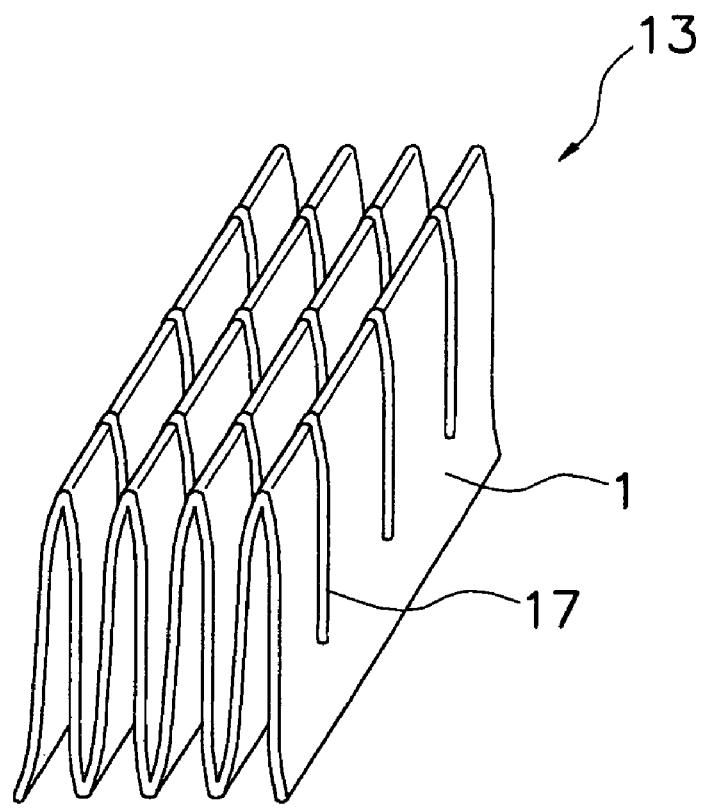
FIG. 3 is a perspective view of a filter pack which employs the first embodiment of the present invention.

As shown in FIG. 3, the filter pack 13 is formed from the filter medium 1 and spacers 17.

The filter medium 1 is employed as noted above, and is processed (pleat processed) into a pleated shape.

The spacers 17 are members that maintain the pleated shape of the pleat processed filter medium 1, and are composed of a hot melt resin adhesive such as a polyamide or the like.

The frame 15 is obtained by assembling together four aluminum frames, and maintaining the filter pack 13 in the interior thereof.

[Method of Producing the Filter Medium]

A method of producing the filter medium is a method for producing the filter medium 1 noted above, and includes a mixing step, a non-sintered tape production step, an elongation step, and a heat lamination step.

In the mixing step, 380 ml or more of a liquid lubricant at 20° C. is added per 1 kg of a PTFE fine powder to obtain a compound containing PTFE fine powder and a liquid lubricant. The amount of liquid lubricant to be mixed therein is preferably 406 ml at 20° C. per 1 kg of PTFE fine powder.

In the non-sintered tape production step, the compound obtained in the mixing step is compressed into a tape shape, and the liquid lubricant is then removed therefrom to obtain a non-sintered PTFE tape.

In the elongation step, the PTFE porous film 3 is obtained by elongating the non-sintered tape. In the elongation step, the total area of the non-sintered tape is elongated to between 80 times and 800 times its original size by first elongating the non-sintered tape in the longitudinal direction between 3 times and 20 times its original length and then elongating the non-sintered tape in the lateral direction between 10 and 50 times its original width.

In the heat lamination step, the air permeable support member 5 noted above is heat laminated to both sides of the PTFE porous film 3. As noted above, the air permeable support member 5 may be laminated to only one surface of the PTFE porous film 3, but it is preferred that the air permeable support member 5 be laminated to the outermost layers of the PTFE porous film 3 when the PTFE porous film has a multi-layer structure like that noted above.

Second Embodiment

[Filter Medium]

Figure 4:
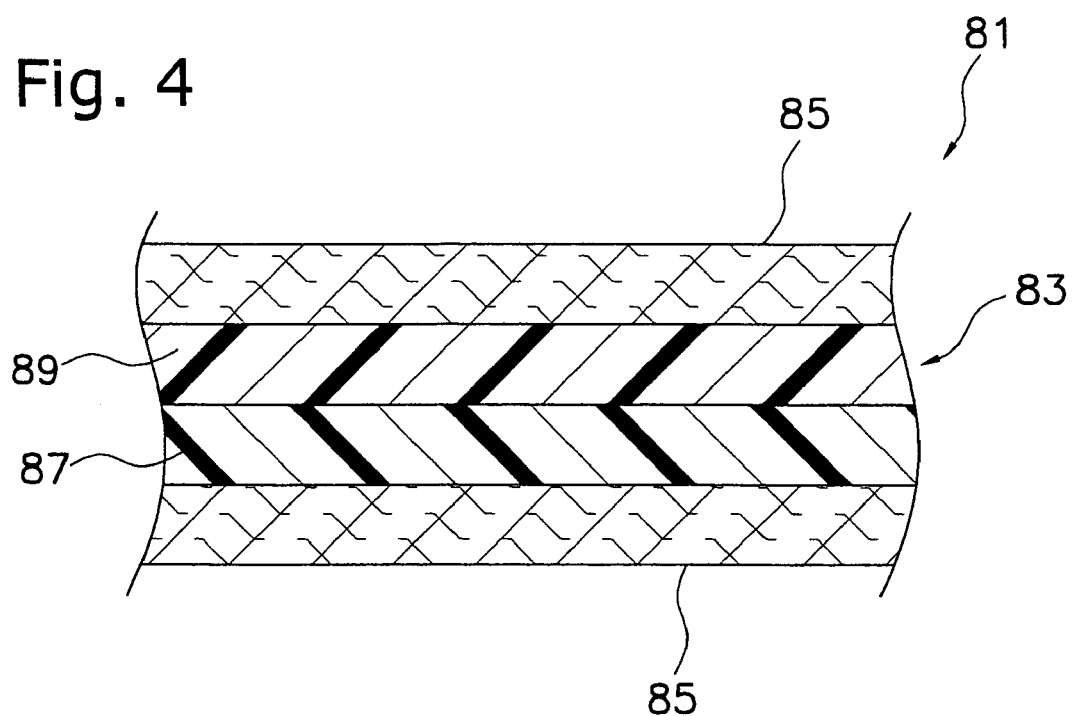
FIG. 4 is a cross-section of a filter paper which employs an example of a second embodiment of the present invention.

FIG. 4 shows a filter medium 21 which employs a second embodiment of the present invention.

The filter medium 81 is composed of a multi-layer porous film 83 and air permeable support members 85.

The multi-layer porous film 83 is a two layer structure that includes a homo-PTFE porous film 87 formed from a homo-PTFE fine powder, and a modified PTFE porous film 89 that is laminated to one surface of the homo-PTFE porous film 87 and formed from a modified PTFE fine powder.

The homo-PTFE porous film 87 has a fiber structure that is finer than that of the modified PTFE porous film 89, and functions as a main collection layer.

The modified PTFE porous film 89 is one in which only enough co-monomer is added to a PTFE homo-monomer so that the PTFE homo-monomer cannot be melt processed (enough to maintain the non-melt processability thereof). Hexafluoropropylene, perfluoroalkyl vinyl ether, perfluoropropyl vinyl ether, trifluorochloroethylene, and the like are preferably employed as the co-monomers. In addition, the modified PTFE porous film 89 has an average pore diameter that is 10 times or greater than the average pore diameter of the homo-PTFE porous film 87. As noted below, the multiplying factor of the average pore diameter is preferably 50 times or greater, and more preferably 100 times or greater, from the point at which the distance between the fibers in the interface area of the homo-PTFE porous film 87 with the modified PTFE porous film 89 becomes enlarged in the elongation step.

Figure 5:
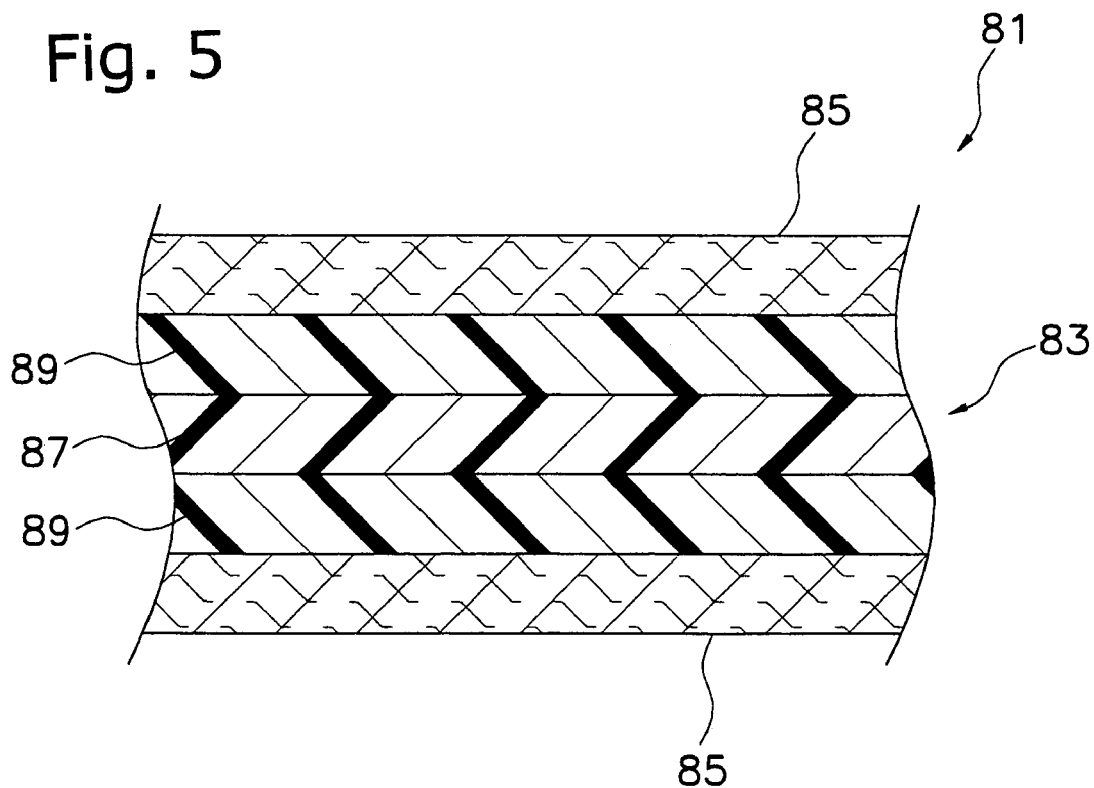
FIG. 5 is a cross-section of a filter paper which employs another example of a second embodiment of the present invention.

As shown in FIG. 5, the multi-layer film 83 of the present invention may be a three layer structure in which the homo-PTFE porous film 87 has two different types or two of the same type of modified PTFE porous films 89 laminated thereto, or may be a multi-layer structure in which a plurality of homo-PTFE porous films 87 and modified PTFE porous films 89 are laminated together.

A multi-layer porous film 83 having this structure will have distances between the fibers in the area of the homo-PTFE porous film 87 that interfaces with the modified PTFE porous film 89 that will be enlarged due to the method of producing the filter medium noted below. Because of this, the decline in the single fiber collection efficiency of the interface area of the homo-PTFE porous film 87 will be controlled. Thus, there will be a surprising and unexpected increase in the PF value of the multi-layer film 83 when compared to the PF value of the prior art. The PF value in this embodiment exceeds 35.

The air permeable support member 85 is heat laminated to at least one surface of the multi-layer porous film 83, but may be heat laminated to the outermost layers of both sides of the filter medium 81. The air permeable support member 85 is composed of a heat fusible non-woven fabric.

A filter medium 81 having this structure will maintain a high PF value (which exceeds 32 in this embodiment), even after the multi-layer porous film 83 is heat laminated to the air permeable support member 85. The PF value is computed in accordance with the following formula, from the pressure loss when air permeates the filter medium at a flow rate of 5.3 cm/s and the collection efficiency measured by employing silica particles having diameters between 0.10 and 0.12 micrometers.

$$PF=[-\log(\text{permeability }(\%)/100)/(\text{pressure loss (Pa)}]\times 1000 \quad \text{[Formula 5]}$$

(Here, permeability (%)=100−collection efficiency (%))

In addition, the filter medium 81 can be employed in a high performance air filter unit such as a HEPA filter (an air filter unit in which the collection efficiency for particles having diameters of 0.3 micrometers or greater is 99.97% or greater, and the pressure loss is between 50 Pa and 500 Pa when air permeates the filter medium at a rate of 1.4 cm/second), a ULPA filter (an air filter unit in which the collection efficiency for particles having diameters of 0.1 micrometers or greater is 99.9999% or greater, and the pressure loss is between 50 Pa and 500 Pa when air permeates the filter medium at a rate of 1.4 cm/second), or the like.

[Air Filter Unit]

Figure 6:
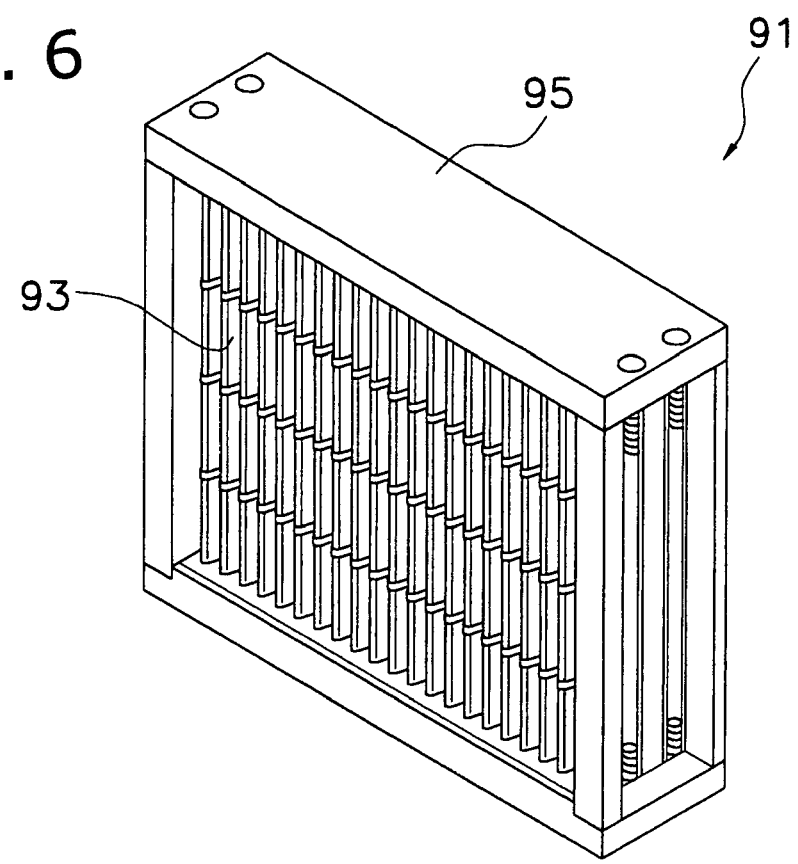
FIG. 6 is a perspective view of an air filter unit which employs the second embodiment of the present invention.

FIG. 6 shows an air filter unit 91 which employs an embodiment of the present invention.

The air filter unit 91 is composed of a filter pack 93, and a frame 95 that accommodates the filter pack 93.

Figure 7:
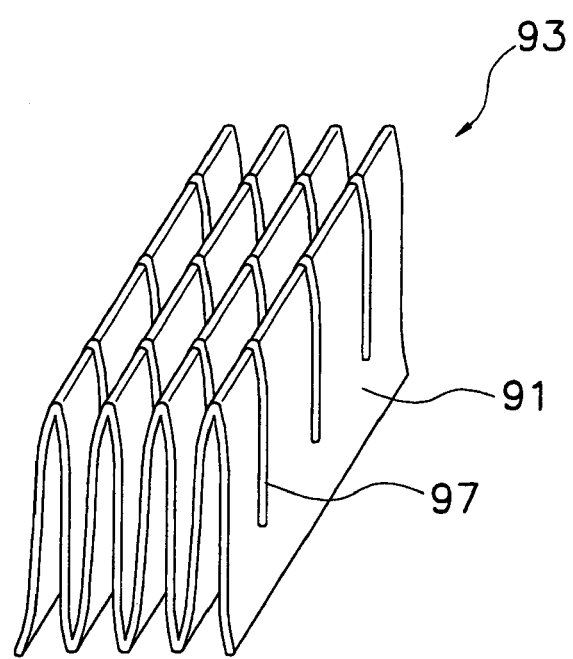
FIG. 7 is a perspective view of a filter pack which employs the second embodiment of the present invention.

As shown in FIG. 7, the filter pack 93 is formed from the filter medium 81 and spacers 97.

The filter medium 81 is employed as noted above, and is processed (pleat processed) into an accordion shape.

The spacers 97 are members that maintain the accordion shape of the pleat processed filter medium 81, and are composed of a hot melt resin adhesive such as a polyamide or the like.

The frame 95 is obtained by assembling together four aluminum frames, and retaining the filter pack 93 in the interior thereof.

[Method of Producing the Filter Medium]

Example 1

Here, a first example of a method of producing the filter medium of the present invention will be described.

The method of producing the filter medium is a method for producing the filter medium 81 noted above, and includes a packing step, an extrusion step, a compression step, an assistant removal step, an elongation step, and a heat lamination step.

In the packing step, a first mixture is made by mixing a homo-PTFE fine power with an assistant (liquid lubricant), and a second mixture is made by mixing a modified PTFE fine power with a liquid lubricant. These compounds are packed separately inside a cylindrical extrusion mold.

In the extrusion step, the first and the second mixtures are unitarily paste extruded.

In the compression step, the first and the second mixtures from the extrusion step are compressed together to obtain a multi-layer formation.

In the assistant removal step, the assistant is removed from the multi-layer formation to obtain a non-sintered tape.

In the elongation step, the non-sintered tape is elongated first in the longitudinal direction and then in the lateral direction to obtain a multi-layer porous film.

In the heat lamination step, an air permeable support member is heat laminated to at least one side of the multi-layer porous film.

Example 2

Here, a second example of a method of producing the filter medium of the present invention will be described.

The method of producing the filter medium is a method for producing the filter medium 81 noted above, and includes an extrusion step, a compression step, an assistant removal step, a lamination step, an elongation step, and a heat lamination step.

In the extrusion step, a first mixture is made by mixing a homo-PTFE fine power with an assistant and a second mixture is made by mixing a modified PTFE fine power with an assistant. These compounds are each paste extruded.

In the compression step, the first and the second mixtures from the extrusion step are compressed together to obtain a first formation and a second formation.

In the assistant removal step, the assistants in the first and the second mixtures are each removed therefrom.

In the lamination step, the first and the second formations from the assistant removal step are placed on top of each other to obtain a non-sintered tape.

In the elongation step, the non-sintered tape is elongated first in the longitudinal direction and then in the lateral direction to obtain a multi-layer porous film.

In the heat lamination step, an air permeable support member is heat laminated to at least one side of the multi-layer porous film.

Example 3

Here, a third example of a method of producing the filter medium of the present invention will be described.

The method of producing the filter medium is a method for obtaining the filter medium 1 noted above, and includes an extrusion step, a compression step, an assistant removal step, a longitudinal elongation step, a lateral elongation step, and a heat lamination step.

In the extrusion step, a first mixture is made by mixing a homo-PTFE fine power with an assistant and a second mixture is made by mixing a modified PTFE fine power with an assistant. These compounds are each paste extruded.

In the compression step, the first and the second mixtures from the extrusion step are compressed together to obtain a first formation and a second formation.

In the assistant removal step, the assistants in the first and the second mixtures each are removed therefrom to obtain two non-sintered tapes.

In the longitudinal elongation step, the two non-sintered tapes are each elongated in the longitudinal direction.

In the lateral elongation step, the two non-sintered tapes elongated in the longitudinal direction are placed on top of each other, and then are elongated in the lateral direction to obtain a multi-layer porous film.

In the heat lamination step, an air permeable support member is heat laminated to at least one side of the multi-layer porous film.

In either of the aforementioned embodiments, the non-sintered tape is elongated in the longitudinal direction between 3 and 20 times its original length, and elongated in the lateral direction between 10 and 50 times its original width. Thus, the total surface area of the non-sintered tape will be between 80 and 800 times its original surface area.

EXAMPLES

The present invention will be described in detail with reference to the examples below. Examples relating to the first embodiment

[Production of a PTFE Filter Medium]

Example 1

First, 406 ml at 20° C. of a hydrocarbon oil (Isopar, a product of Esso Petroleum Co.) as an liquid extrusion assistant were added per 1 kg of PTFE fine powder having a number average molecular weight of 6,500,000 (POLYFRON FINE POWDER F-104U, a product of Daikin Industry Co.), and those were mixed together.

Next, this mixture was molded into a rod shape by paste extrusion. Then, this rod-shaped formation was formed into a film shape by calendar rolls heated to 70° C. to obtain a PTFE film. The film was passed through a hot air drying oven at 250° C. to dry and remove the extrusion assistant, thereby obtaining a non-sintered PTFE film having an average thickness of 200 micrometers and an average width of 150 mm.

Figure 8:
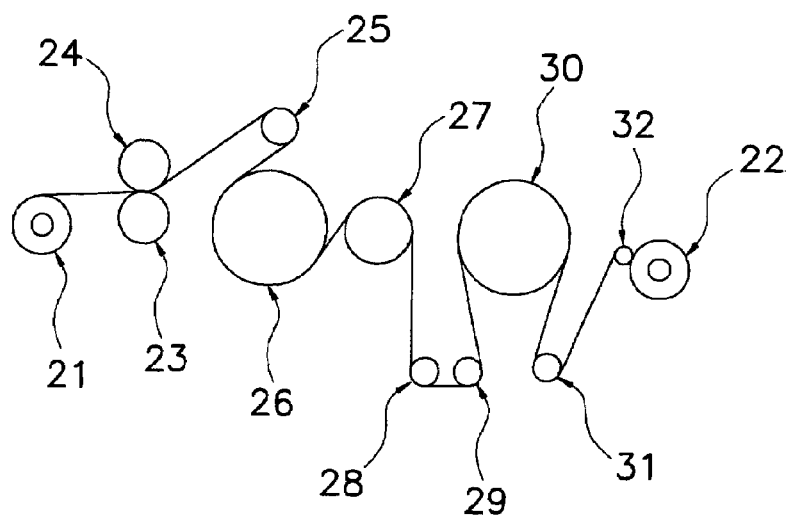
FIG. 8 shows a device that elongates a PTFE film in the longitudinal direction.

Next, the non-sintered PTFE film was elongated so as to be 5 times larger in the longitudinal direction by using a device shown in FIG. 8. The non-sintered film was set on a roll 21, and the elongated film was wound onto a take-up roll 22. In addition, the elongation temperature was 250° C. Note that in FIG. 8, 23 to 25 are rolls, 26, 27 are heating rolls, and 28 to 32 are rolls.

Figure 9:
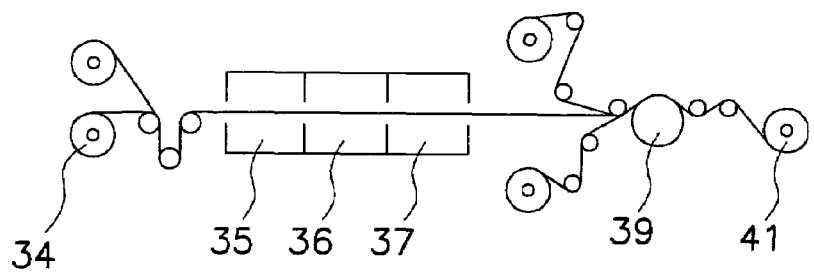
FIG. 9 shows a device (left half) used to laterally stretch a PTFE film, and a device (right half) that laminates a non-woven fabric on the PTFE film.

Next, the longitudinally stretched film obtained was elongated so as to be 45 times larger in the lateral direction by using an device (tenter) shown in the left half of FIG. 9 that can continuously grasp the film with clips, and then heat fixation was conducted on the film. At this point, the elongation temperature was 290° C., and the heat fixation temperature was 360° C.

A filter medium is obtained by employing the non-woven fabrics A, B noted below and heat fusing them to both surfaces of the PTFE porous film noted above by means of the device shown on the right half of FIG. 9.

Non-woven fabric A: "Eleves S0403WDO", a PET/PE core/sheath non-woven fabric produced by Unitika K.K. and having a basis weight of 40 g/m².

Non-woven fabric B: "Eleves T0403WDO", a PET/PE core/sheath non-woven fabric produced by Unitika K.K. and having a basis weight of 40 g/m².

Note that in FIG. 9, 34 is an wind-out roll, 35 is a pre-heating zone, 36 is an elongation zone, 37 is a heat fixation zone, 39 is a lamination roll, and 41 is a take-up roll.

In addition, the conditions at which heat fusion is conducted are as follows:

Temperature: 200° C., line speed: 15 m/min.

Example 2

Except for the addition of 430 ml of a liquid lubricant at 20° C. per each 1 kg of PTFE fine powder, the filter medium produced here was identical with that produced in Example 1.

Comparative Example 1

Except for the addition of 317 ml of a liquid lubricant at 20° C. per each 1 kg of PTFE fine powder, the filter medium produced here was identical with that produced in Example 1.

Comparative Example 2

Except for the addition of 355 ml of a liquid lubricant at 20° C. per each 1 kg of PTFE fine powder, the filter medium produced here was identical with that produced in Example 1.

The performance values of the porous films and mediums of Examples 1, 2 and Comparative Examples 1, 2 are shown in Table 1. Note that in Table 1, the percentage decline was calculated by dividing the actual value of $\eta$ by the calculated value of $\eta$.

Comparative Example 3

An air filter unit was produced in the same manner as in Example 3 except that the filter medium for air filters produced in Comparative Example 1 was employed therein.

A comparison between the physical properties of the air filter units of Example 3 and Comparative Example 3 are shown in Table 2.

TABLE 1

| | | Film thickness (μm) | Packing ratio (%) | Average fiber diameter (μm) | Pressure loss (Pa) | Collection efficiency (%) | $PF_1$ value | $\eta$ Actual value | $\eta$ Calculated value | Percent decline (%) |
|---|---|---|---|---|---|---|---|---|---|---|
| Example 1 | Porous film | 16.0 | 4.5 | 0.053 | 154 | 99.999909 | 39.2 | 3.68 | 4.16 | 88.5 |
| | Medium | — | — | — | 157 | 99.99964 | 34.7 | — | — | — |
| Example 2 | Porous film | 15.0 | 4.0 | 0.049 | 141 | 99.99988 | 42.0 | 4.03 | 4.48 | 89.9 |
| | Medium | — | — | — | 142 | 99.99948 | 37.2 | — | — | — |
| Comparative Example 1 | Porous film | 16.1 | 8.5 | 0.069 | 220 | 99.999919 | 27.7 | 2.44 | 3.30 | 73.9 |
| | Medium | — | — | — | 223 | 99.99936 | 23.3 | — | — | — |
| Comparative Example 2 | Porous film | 16.1 | 7.3 | 0.065 | 201 | 99.999954 | 31.5 | 2.67 | 3.47 | 76.9 |
| | Medium | — | — | — | 204 | 99.99964 | 26.7 | — | — | — |

As shown in Table 1, the packing ratio, average fiber diameter, pressure loss, and percentage decline of Examples 1, 2 are smaller than those of Comparative Examples 1, 2, and the collection ratio and $PF_1$ value of Examples 1, 2 are larger than those of Comparative Examples 1, 2. Because of this, when the amount of liquid lubricant mixed per 1 kg of PTFE fine powder is increased, the decline in the packing ratio, pressure loss, and percentage decline of the filter medium of the present invention are controlled to a level lower than that of the prior art, and the collection efficiency and the $PF_1$ value of the filter medium of the present invention will increase.

In addition, all of the values for the physical properties shown for Example 2 are superior to those of Example 1, and thus the effect of increasing the amount of liquid lubricant to be mixed with the PTFE fine powders was confirmed.

[Production of the Air Filter Unit]

Example 3

The filter medium produced in Example 1 was pleated with a reciprocating folding machine so that the height of the filter medium was 5.5 cm, and after pleating, the pleats were set by heating the filter medium at 90° C. The pleated filter medium was then unfolded once, spacers made of a polyamide hot melt resin were applied thereto, the filter medium was pleated again with a reciprocating raising machine, and the filter medium was then cut to 58 cm×58 cm to obtain an air filter pack. Pleat distance here was 3.125 mm/pleat.

Next, an alumite-processed aluminum frame having outer dimensions of 61 cm×61 cm, inner dimensions of 58 cm×58 cm, and a thickness of 6.5 cm was prepared, the pleated air filter pack was inserted into this frame, and the periphery of the air filter pack and the aluminum frame were sealed with a urethane adhesive to thereby obtain an air filter unit.

TABLE 2

| | Pressure loss (Pa) | Collection efficiency (%) | $PF_2$ value |
|---|---|---|---|
| Example 3 | 51 | 99.999989 | 136.8 |
| Comparative Example 3 | 69 | 99.999970 | 94.5 |

As shown in Table 2, the pressure loss of Example 3 is controlled in comparison to Comparative Example 3, the collection efficiency of Example 3 is high, and the $PF_2$ value is much higher. Thus, by increasing the amount of liquid lubricant mixed with the PTFE fine powder, an air filter unit having a surprising and unexpected increase in the $PF_2$ value will be obtained.

Examples Relating to the Second Embodiment

[Production of a Multi-Layer PTFE Filter Medium]

Example 4

28 parts by weight of a hydrocarbon oil (Isopar, a product of Esso Petroleum Co.) as an liquid extrusion assistant were added per 1 kg of a homo-PTFE fine powder-1 having a number average molecular weight of 7,000,000 (POLYFRON FINE POWDER F-104U, a product of Daikin Industry Co.), and these were mixed together.

In addition, 23 parts by weight of a hydrocarbon oil (Isopar, a product of Esso Petroleum Co.) as an liquid extrusion assistant were added to 100 parts by weight of a trifluorochloroethylene modified PTFE fine powder-2 having a number average molecular weight of 5,600,000 (POLYFRON FINE POWDER F-201, a product of Daikin Industry Co.), and these were mixed together.

Figure 11:
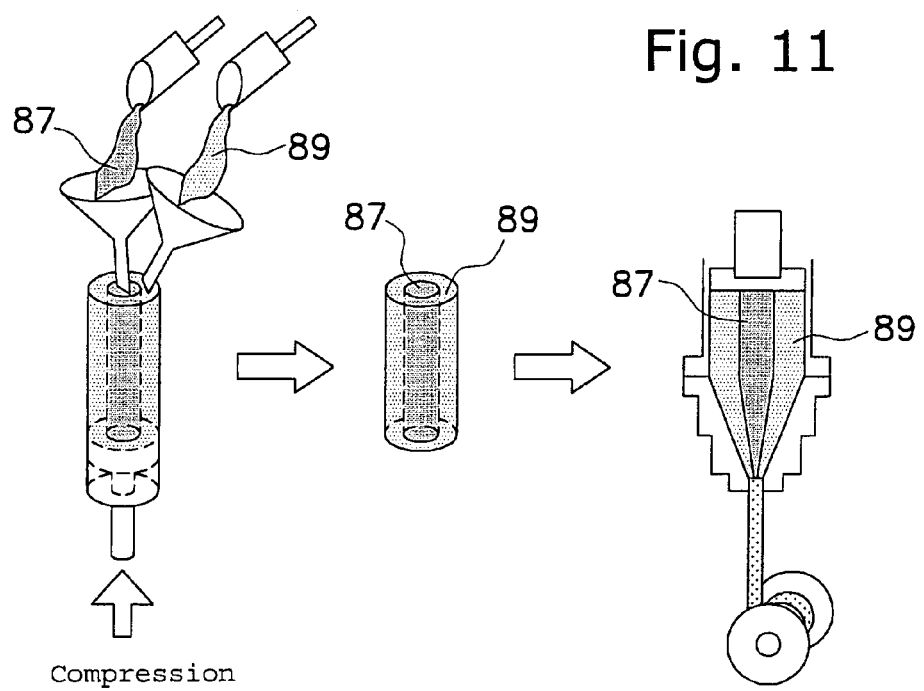
FIG. 11 shows an example of a method of producing the filter medium according to the second embodiment of the present invention.

Then, in the process shown in FIG. 11, a concentric circular multi-layer pre-formation was obtained by placing the homo-PTFE fine powder in the center thereof, the pre-formation having a volume ratio of homo-PTFE fine powder to modified PTFE fine powder of 3:2.

Next, this multi-layer pre-formation was formed into a cylindrical shape by paste extrusion. Then, the cylindrical-shaped formation was formed into a film shape by calendar rolls heated to 70° C. to obtain a multi-layer PTFE film. The multi-layer PTFE film was passed through a hot air drying oven at 250° C. to dry and remove the extrusion assistant, thereby obtaining a multi-layer non-sintered PTFE film having an average thickness of 200 micrometers and an average width of 150 mm.

Figure 12:
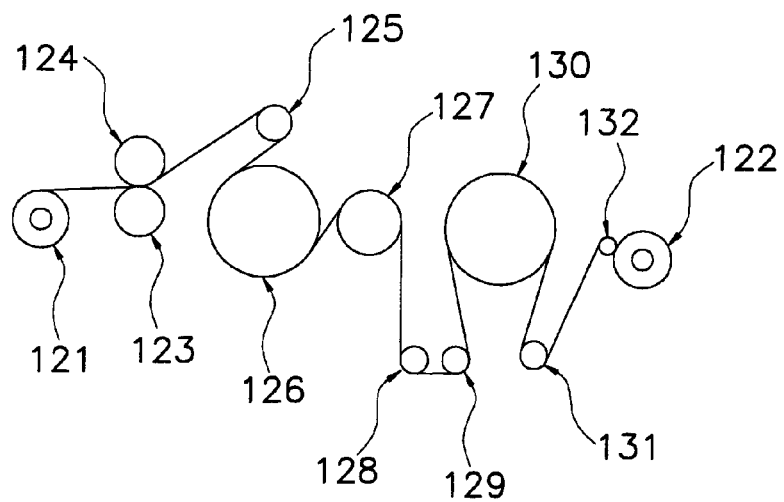
FIG. 12 shows a device that elongates a PTFE film in the longitudinal direction.

Next, the non-sintered PTFE film was elongated so as to be 7.5 times larger in the longitudinal direction by using a device shown in FIG. 12. The non-sintered film was set on a roll 21, and the elongated film was wound onto a take-up roll 122. In addition, the elongation temperature was set to 1250° C. Note that in FIG. 12, 123 to 125 are rolls, 126, 127 are heating rolls, and 128 to 132 are rolls.

Figure 13:
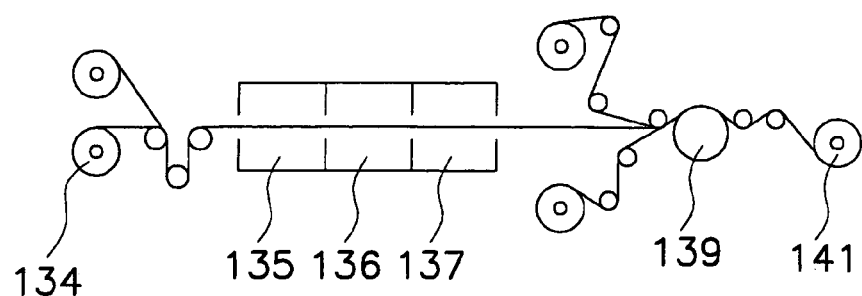
FIG. 13 shows a device (left half) used to stretch a PTFE film along its width, and a device (right half) that laminates a non-woven fabric on the PTFE film.

Next, the longitudinally stretched film obtained was stretched so as to be 45 times larger in a lateral direction using an apparatus (tenter) shown in left half of FIG. 13 that can continuously grasp the film with clips, and heat fixation was conducted to obtain a multi-layer porous PTFE film. At this time, the elongation temperature was 290° C., the heat fixation temperature was 345° C., and the elongation speed was 500%/sec.

Example 5

The multi-layer PTFE porous film obtained here is identical to that of Example 4, except that the trifluorochloroethylene modified PTFE fine powder-2 (POLYFRON FINE POWDER F-201, a product of Daikin Industry Co.) was replaced with perfluoropropyl vinyl ether modified PTFE fine powder-3 (POLYFRON FINE POWDER F-302, a product of Daikin Industry Co.), and 26 parts by weight of a liquid extrusion assistant were added thereto and mixed together to obtain a multi-layer non-sintered PTFE film having an average thickness of 200 micrometers and an average width of 150 mm.

Example 6

28 parts by weight of a hydrocarbon oil (isopar, a product of Esso Petroleum Co.) as an liquid extrusion assistant were added per 1 kg of homo-PTFE fine powder having a number average molecular weight of 7,000,000 (POLYFRON FINE POWDER F-104U, a product of Daikin Industry Co.), and these were mixed together.

In addition, 23 parts by weight of a hydrocarbon oil (Isopar, a product of Esso Petroleum Co.) as an liquid extrusion assistant were added to 100 parts by weight of a trifluorochloroethylene modified PTFE fine powder-2 having a number average molecular weight of 5,600,000 (POLYFRON FINE POWDER F-201, a product of Daikin Industry Co.), and these were mixed together.

Figure 14:
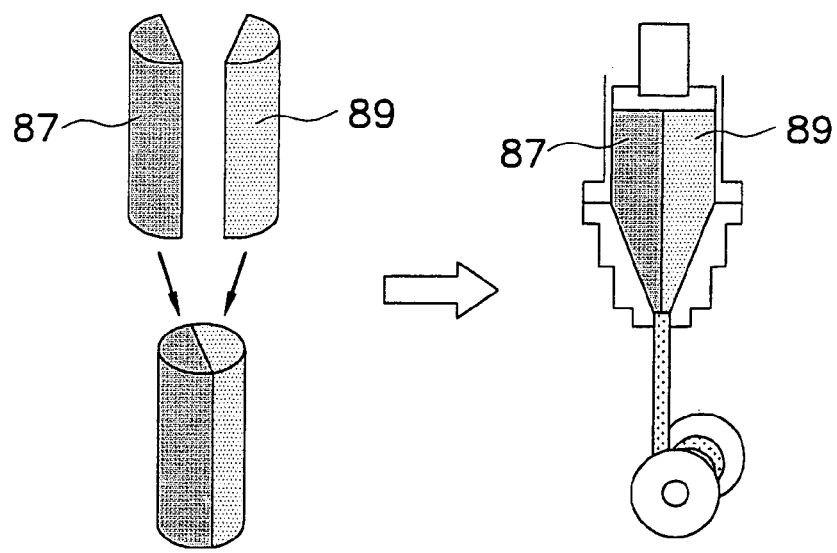
FIG. 14 shows another example of a method of producing the filter medium according to the second embodiment of the present invention.
Figure 15:
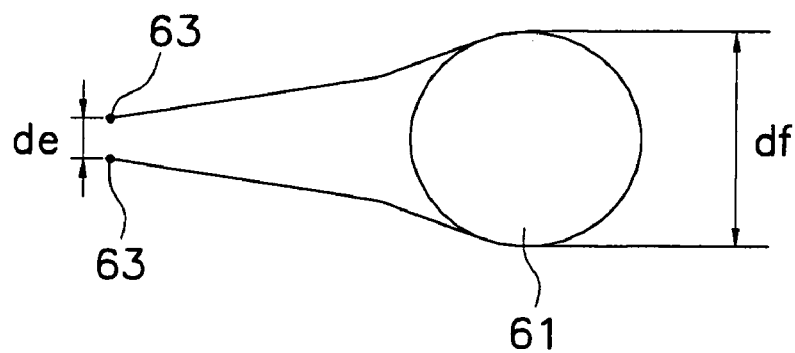
FIG. 15 shows the relationship between the fibers of a conventional medium and the particles collected by these fibers.
Figure 16:
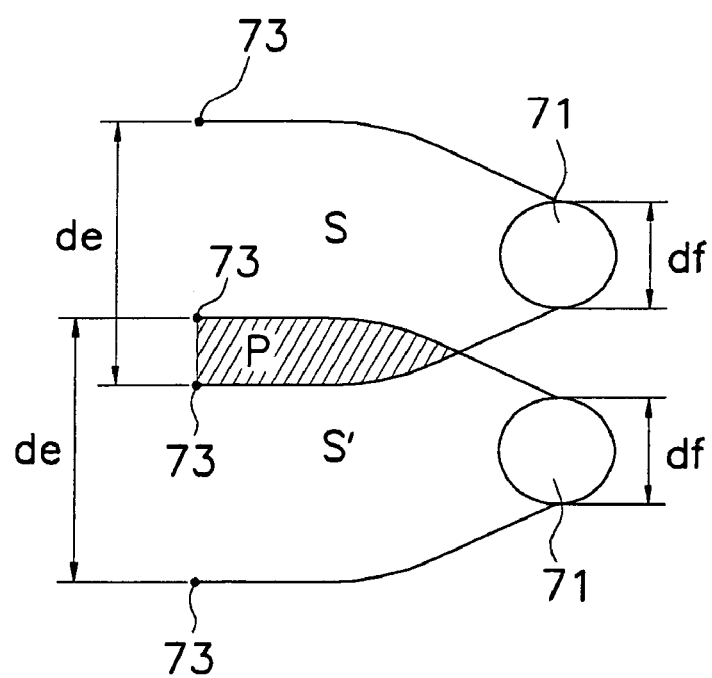
FIG. 16 shows the relationship between the fibers that form a PTFE porous film and the particles collected by these fibers.

Then, a multi-layer pre-formation was obtained in which the thickness of each layer was formed at a 1:1 ratio by means of the process shown in FIG. 14.

Next, this multi-layer pre-formation was formed into an elliptical cylindrical shape by paste extrusion. Then, the elliptical cylinder-shaped formation was formed into a film shape by calendar rolls heated to 70° C. to obtain a multi-layer PTFE film. The multi-layer PTFE film was passed through a hot air drying oven at 250° C. to dry and remove the extrusion assistant, thereby obtaining a multi-layer non-sintered PTFE film having an average thickness of 200 micrometers and an average width of 150 mm. Then, a multi-layer PTFE porous film identical to that of Example 4 was obtained.

Example 7

The multi-layer PTFE porous film obtained here is identical to that of Example 4, except that the trifluorochloroethylene modified PTFE fine powder-2 (POLYFRON FINE POWDER F-201, a product of Daikin Industry Co.) was replaced with perfluoropropyl vinyl ether modified PTFE fine powder-3 (POLYFRON FINE POWDER F-302, a product of Daikin Industry Co.), and 26 parts by weight of a liquid extrusion assistant were added thereto and mixed together to obtain a multi-layer non-sintered PTFE film having an average thickness of 200 micrometers and an average width of 150 mm.

Example 8

28 parts by weight of a hydrocarbon oil (Isopar, a product of Esso Petroleum Co.) as an liquid extrusion assistant were added per 1 kg of homo-PTFE fine powder having a number average molecular weight of 7,000,000 (POLYFRON FINE POWDER F-104U, a product of Daikin Industry Co.), and these were mixed together.

In addition, 23 parts by weight of a hydrocarbon oil (Isopar, a product of Esso Petroleum Co.) as an liquid extrusion assistant were added to 100 parts by weight of a trifluorochloroethylene modified PTFE fine powder-2 having a number average molecular weight of 5,600,000 (POLYFRON FINE POWDER F-201, a product of Daikin Industry Co.), and these were mixed together.

Next, the homo-PTFE and modified PTFE fine powders were each formed into cylindrical shapes by paste extrusion. Then, each cylinder-shaped formation was formed into a film shape by calendar rolls heated to 70° C. to obtain a PTFE film. These films were passed through a hot air drying oven at 250° C. to dry and remove the extrusion assistant, thereby obtaining a homo-PTFE non-sintered PTFE film having an average thickness of 100 micrometers and an average width of 134 mm and a modified PTFE non-sintered PTFE film having an average thickness of 100 micrometers and an average width of 126 mm.

Next, the homo-PTFE non-sintered film and the modified PTFE non-sintered film were placed on top of each other in two layers, and elongated so as to be 7.5 times larger in the longitudinal direction by using a device shown in FIG. 12. The layered non-sintered film was set on a roll 121, and the elongated film was wound onto a take-up roll 122. In addition, the elongation temperature was 250° C.

Next, the longitudinally stretched film obtained was stretched so as to be 45 times larger in a lateral direction using the device shown in the left half of FIG. 13, and heat fixation was conducted to obtain a multi-layer porous PTFE film. At this time, the elongation temperature was 290° C., the heat fixation temperature was 345° C., and the elongation speed was 500%/sec.

Example 9

The multi-layer PTFE porous film obtained here is identical to that of Example 8, except that the trifluorochloroethylene modified PTFE fine powder-2 (POLYFRON FINE POWDER F-201, a product of Daikin Industry Co.) was replaced with perfluoropropyl vinyl ether modified PTFE fine powder-3 (POLYFRON FINE POWDER F-302, a product of Daikin Industry Co.), and 26 parts by weight of a liquid extrusion assistant were added thereto and mixed together to obtain a multi-layer non-sintered PTFE film.

Example 10

The homo-PTFE non-sintered film of Example 8 was place in between two sheets of the modified PTFE non-sintered film of Example 8, and these films were elongated so as to be 7.5 times larger in the longitudinal direction by using a device shown in FIG. 12. The layered non-sintered film was set on a roll 121, and the elongated film was wound onto a take-up roll 122. In addition, the elongation temperature was 250° C.

Next, the longitudinally stretched film obtained was stretched so as to be 45 times larger in a lateral direction using the device shown in the left half of FIG. 13, and heat fixation was conducted to obtain a multi-layer porous PTFE film. At this time, the elongation temperature was 290° C., the heat fixation temperature was 345° C., and the elongation speed was 500%/sec.

Example 11

28 parts by weight of a hydrocarbon oil (Isopar, a product of Esso Petroleum Co.) as an liquid extrusion assistant were added per 1 kg of homo-PTFE fine powder having a number average molecular weight of 7,000,000 (POLYFRON FINE POWDER F-104U, a product of Daikin Industry Co.), and were mixed together.

In addition, 23 parts by weight of a hydrocarbon oil (Isopar, a product of Esso Petroleum Co.) as an liquid extrusion assistant were added to 100 parts by weight of a trifluorochloroethylene modified PTFE fine powder-2 having a number average molecular weight of 5,600,000 (POLYFRON FINE POWDER F-201, a product of Daikin Industry Co.), and these were mixed together.

Next, the homo-PTFE and modified PTFE fine powders were formed into a cylindrical shape by paste extrusion. Then, each cylinder-shaped formation was formed into a film shape by calendar rolls heated to 70° C. to obtain a PTFE film. These films were passed through a hot air drying oven at 250° C. to dry and remove the extrusion assistant, thereby obtaining a homo-PTFE non-sintered PTFE film having an average thickness of 50 micrometers and an average width of 152 mm and a modified PTFE non-sintered PTFE film having an average thickness of 100 micrometers and an average width of 126 mm.

A multi-layer PTFE porous film was obtained that is identical to that of Example 10, except that the aforementioned modified PTFE non-sintered film was placed in between two of the aforementioned homo-PTFE non-sintered films.

Example 12

The homo-PTFE non-sintered film of Example 8 and the modified PTFE non-sintered film of Example 8 were each elongated so as to be 7.5 times larger in the longitudinal direction by using a device shown in FIG. 12. The non-sintered films were set on a roll 121, and the elongated films were wound onto a take-up roll 122. In addition, the elongation temperature was 250° C.

Next, the longitudinally stretched homo-PTFE non-sintered film and modified PTFE non-sintered film were placed on top of each other, and were stretched so as to be 45 times larger in a lateral direction using the device shown in the left half of FIG. 13, and heat fixation was conducted to obtain a multi-layer porous PTFE film. At this time, the elongation temperature was 290° C., the heat fixation temperature was 345° C., and the elongation speed was 500%/sec.

Example 13

The longitudinally stretched homo-PTFE non-sintered film of Example 12 was placed in between the two longitudinally stretched modified PTFE non-sintered films of Example 12, and were stretched so as to be 45 times larger in a lateral direction using the device shown in the left half of FIG. 13, and heat fixation was conducted to obtain a multi-layer porous PTFE film. At this time, the elongation temperature was 290° C., the heat fixation temperature was 345° C., and the elongation speed was 500%/sec.

Example 14

The homo-PTFE non-sintered film of Example 11 and the modified PTFE non-sintered films of Example 11 were each elongated so as to be 7.5 times larger in the longitudinal direction by using a device shown in FIG. 12. The non-sintered film was set on a roll 121, and the elongated film was wound onto a take-up roll 122. In addition, the elongation temperature was 250° C.

The longitudinally stretched modified PTFE non-sintered film was placed in between two longitudinally stretched homo-PTFE non-sintered films, and were stretched so as to be 45 times larger in a lateral direction using the device shown in the left half of FIG. 13, and heat fixation was conducted to obtain a multi-layer porous PTFE film. At this time, the elongation temperature was 290° C., the heat fixation temperature was 345° C., and the elongation speed was 500%/sec.

Comparative Example 4

28 parts by weight of a hydrocarbon oil (Isopar, a product of Esso Petroleum Co.) as an liquid extrusion assistant were added per 1 kg of homo-PTFE fine powder having a number average molecular weight of 7,000,000 (POLYFRON FINE POWDER F-104U, a product of Daikin Industry Co.), and these were mixed together.

Next, the homo-PTFE fine powder was formed into a cylindrical shape by paste extrusion. Then, the cylinder-shaped formation was formed into a film shape by calendar rolls heated to 70° C. to obtain a PTFE film. In addition, the film was passed through a hot air drying oven at 250° C. to dry and remove the extrusion assistant, thereby obtaining a homo-PTFE non-sintered film having an average thickness of 100 micrometers and an average width of 152 mm.

Next, the homo-PTFE non-sintered film was elongated so as to be 7.5 times larger in the longitudinal direction by using a device shown in FIG. 12. The non-sintered film was set on a roll 121, and the elongated film was wound onto a take-up roll 122. In addition, the elongation temperature was 250° C.

Next, the longitudinally stretched film obtained was stretched so as to be 45 times larger in the lateral direction using the device shown in the left half of FIG. 13, and heat fixation was conducted to obtain a single layer porous PTFE film. At this time, the elongation temperature was 290° C., the heat fixation temperature was 345° C., and the elongation speed was 500%/sec.

Example 15 and Comparative Example 5

Filter mediums were obtained by employing the non-woven fabrics A, B noted below and heat fusing them to both surfaces of the PTFE porous films of Examples 4 to 14 and Comparative Example 4 by means of the device shown on the right half of FIG. 13.

Non-woven fabric A: "Eleves S0403WDO", a PET/PE core/sheath non-woven fabric produced by Unitika K.K. and having a basis weight of 40 g/m$^2$.

Non-woven fabric B: "Eleves T0403WDO", a PET/PE core/sheath non-woven fabric produced by Unitika K.K. and having a basis weight of 40 g/m$^2$.

Note that in FIG. 13, 134 is an wind-out roll, 135 is a pre-heating zone, 136 is an elongation zone, 137 is a heat fixation zone, 139 is a lamination roll, and 131 is a take-up roll.

In addition, the conditions at which heat fusion is conducted are as follows:

Temperature: 200° C., line speed: 15 m/min.

Table 3 below shows the physical properties of the porous films of Examples 4 to 14 and Comparative Example 4, and the filter mediums that had these non-woven fabrics heat laminated thereto.

As shown in Table 3, each of the Examples 4 to 14 had a pressure loss that was controlled, and an increased collection efficiency and PF1 value, when compared to Comparative Example 4. Thus, a porous film and a medium having superior characteristics was obtained by employing a homo-PTFE porous film and a modified PTFE porous film as a multi-layer porous film.

Example 16 and Comparative Example 6

The filter mediums produced in Example 15 and Comparative Example 5, in which non-woven fabrics were heat laminated to the porous films of Examples 4 to 14 and Comparative Example 4, were pleated with a reciprocating folding machine so that the height of the filter medium was 5.5 cm, and after pleating, the pleats were set by heating the filter medium at 90° C. The pleated filter medium was then unfolded once, spacers made of a polyamide hot melt resin were applied thereto, the filter medium was again pleated with a reciprocating raising machine, and the filter medium was then cut to 58 cm×58 cm to obtain an air filter pack. Pleat distance here was 3.125 mm/pleat.

Next, an alumite-processed aluminum frame having outer dimensions of 61 cm×61 cm, inner dimensions of 58 cm×58 cm, and a thickness of 6.5 cm was prepared, the pleated air filter pack was inserted into this frame, and the periphery of the air filter pack and the aluminum frame were sealed with a urethane adhesive to thereby obtain an air filter unit.

TABLE 3

| | | Pressure loss (Pa) | Collection efficiency (%) | PF$_1$ value | homo-PTFE Average pore diameter (μm) | Modified PTFE Average pore diameter (μm) | Modified/homo pore diameter ratio |
|---|---|---|---|---|---|---|---|
| Example 4 | Porous film | 159 | 99.9999906 | 44.2 | 0.514 | 1280 | 2490 |
| | Medium | 161 | 99.999953 | 39.3 | — | — | — |
| Example 5 | Porous film | 170 | 99.9999966 | 43.9 | 0.534 | 250 | 468 |
| | Medium | 172 | 99.999973 | 38.2 | — | — | — |
| Example 6 | Porous film | 141 | 99.999963 | 45.6 | 0.810 | 1420 | 1753 |
| | Medium | 140 | 99.99979 | 40.5 | — | — | — |
| Example 7 | Porous film | 150 | 99.999976 | 44.1 | 0.550 | 320 | 582 |
| | Medium | 152 | 99.99989 | 39.2 | — | — | — |
| Example 8 | Porous film | 173 | 99.9999966 | 43.2 | 0.454 | 1150 | 2533 |
| | Medium | 177 | 99.999984 | 38.4 | — | — | — |
| Example 9 | Porous film | 175 | 99.9999978 | 43.8 | 0.413 | 230 | 557 |
| | Medium | 179 | 99.999989 | 38.8 | — | — | — |
| Example 10 | Porous film | 151 | 99.999979 | 44.2 | 0.796 | 1415 | 1778 |
| | Medium | 152 | 99.999904 | 39.6 | — | — | — |
| Example 11 | Porous film | 190 | 99.9999995 | 43.8 | 0.480 | 1080 | 2250 |
| | Medium | 194 | 99.9999969 | 38.7 | — | — | — |
| Example 12 | Porous film | 180 | 99.9999987 | 43.8 | 0.510 | 1320 | 2588 |
| | Medium | 181 | 99.999989 | 38.4 | — | — | — |
| Example 13 | Porous film | 157 | 99.999989 | 44.3 | 0.680 | 1520 | 2235 |
| | Medium | 160 | 99.999948 | 39.3 | — | — | — |
| Example 14 | Porous film | 195 | 99.9999995 | 43.2 | 0.495 | 1320 | 2667 |
| | Medium | 197 | 99.9999967 | 38.0 | — | — | — |
| Comparative Example 4 | Porous film | 199 | 99.999959 | 32.1 | 0.505 | — | — |
| | Medium | 202 | 99.99983 | 28.5 | — | — | — |

The physical characteristics of each air filter unit are shown in Table 4 below.

TABLE 4

|  | Pressure loss (Pa) | Collection efficiency (%) | $PF_2$ value |
|---|---|---|---|
| Unit of Example 4 | 52 | 99.9999955 | 141.2 |
| Unit of Example 5 | 56 | 99.9999984 | 139.4 |
| Unit of Example 6 | 46 | 99.999978 | 144.9 |
| Unit of Example 7 | 52 | 99.9999955 | 141.3 |
| Unit of Example 8 | 57 | 99.9999990 | 140.2 |
| Unit of Example 9 | 58 | 99.9999993 | 140.3 |
| Unit of Example 10 | 48 | 99.999990 | 145.6 |
| Unit of Example 11 | 61 | 99.9999996 | 138.4 |
| Unit of Example 12 | 56 | 99.9999984 | 139.2 |
| Unit of Example 13 | 52 | 99.9999959 | 142.1 |
| Unit of Example 14 | 62 | 99.9999998 | 138.9 |
| Unit of Comparative Example 4 | 63 | 99.99990 | 95.0 |

As shown in Table 4, like in Table 3, each of the units of Examples 4 to 14 had a pressure loss that was controlled, and an increased collection efficiency and $PF_2$ value, when compared to Comparative Example 4. Thus, an air filter unit having superior characteristics was obtained by employing a homo-PTFE porous film and a modified PTFE porous film as a multi-layer porous film.

Measurement of Various Data Relating to the Aforementioned Examples and Comparative Examples

[Pressure Loss (Pa) of Porous PTFE Films and Filter Mediums]

Measurement samples of PTFE porous films and filter mediums were set in a filter holder having a diameter of 100 mm, the inlet sides of the films and mediums were pressurized with a compressor, and the flow rate of the air that permeated through the films and mediums was adjusted to 5.3 cm/sec with a flow meter. Pressure loss at that time was measured with a manometer.

[Collection Efficiency (%) of PTFE Porous Films and Filter Mediums]

Measurement samples of PTFE porous films and filter mediums were set in a filter holder having a diameter of 100 mm, the inlet sides of the films and the mediums were pressurized with a compressor, and the flow rate of the air that permeated through the films and mediums was adjusted to 5.3 cm/sec with a flow meter. In this state, silica particles having a particle size of 0.10 to 0.12 micrometers and a particle concentration of $10^8$/300 ml flowed from the upstream side of the films and mediums, the number of particles having a particle size of 0.10 to 0.12 micrometers that permeated the films and mediums were counted with a particle counter (PMS LAS-X-CRT, manufactured by PARTICLE MEASURING SYSTEM INC. (PMS)) arranged on the downstream of the films and mediums, and the number of particles on the upstream side and the downstream side of the films and mediums were compared. In other words, when the particle concentration on the upstream side of a measurement is represented by Ci and the particle concentration on the downstream side of the measurement sample is represented by Co, the collection efficiency of the measurement sample was calculated by the following formula:

Collection efficiency (%)=(1−Co/Ci)×100 [Formula 6]

In addition, a filter medium having an extremely high collection efficiency was measured by prolonging the suction time and increasing the amount of sample air. For example, when the suction time was 10 times longer, the number of particles counted on the downstream side was 10 times greater, and 10 times more measurement sensitivity was obtained.

[Permeability (%) of PTFE Porous Films and Filter Mediums]

The permeability of PTFE porous films and filter mediums were measured by the following formula:

Permeability (%)=100−collection efficiency (%) [Formula 7]

[PF Value of PTFE Porous Films and Filter Mediums]

The $PF_1$ values of the PTFE porous films and filter mediums were obtained by inserting the pressure loss and permeability of the PTFE porous films and filter mediums into the following formula:

$PF_1$ value=[−log(permeability (%)/100)/(pressure loss (Pa)]×1000 [Formula 8]

[Thickness of PTFE Porous Film]

A device for measuring film thickness (1D-110MH, produced by Mitsutoyo Co.) was used to measure the thickness of a stack of 5 sheets of PTFE porous film, and the value obtained thereby was divided by 5 to obtain the thickness of one sheet of film.

[Packing Ratio of PTFE Porous Film]

A PTFE porous film with a known thickness was cut into a 20×20 cm square, was weighed, and the packing ratio was obtained by means of the following formula:

Packing ratio (%)=[weight (g)/(400×film thickness (cm)×2.25(density of PTFE))]×100 [Formula 9]

[Average Fiber Diameter of PTFE Porous Film]

A scanning electron microscope (S-4000, produced by Hitachi Corp.) was employed to take an enlarged photograph (7000× magnification) of the PTFE porous films. This photograph was enlarged into a quarter, 4 straight lines of equal length were drawn on the photograph 5 cm apart in both the vertical and horizontal directions (length: 24.5 cm vertical, 29.5 cm horizontal), the diameters of the PTFE fibers above these lines were measured, and the average fiber diameter of the PTFE fibers was obtained by taking the average of these measurements.

[Calculated Single Fiber Collection Efficiency of the PTFE Porous Film]

The calculated single fiber collection efficiency $\eta$ was obtained by means of the general single fiber collection theorem shown below.

$\eta=2.7Pe^{-2/3}(1+0.39h^{-1/3}Pe^{1/3}Kn)+0.624Pe^{-1}+\frac{1}{2}h[(1+R)^{-1}-(1+R)+2(1+R)\ln(1+R)+2.86(2+R)R(1+R)^{-1}Kn]+1.24h^{-1/2}Pe^{-1/2}R^{2/3}$, where Pe $(3\pi\mu d_p u d_f)/[(1−\alpha)CcKT]$;

Cc=1+2.514l/$d_p$+0.8l/$d_p$exp(−0.55$d_p$/l) l=0.065 (air particle mean free path);

h=−0.51n$\alpha$'−0.52+0.64$\alpha$'+1.43(1−$\alpha$')Kn $\alpha$'=$\alpha$/(1+$\sigma$)

Kn=2l/$d_f$

R=$d_p$/$d_f$; and $\mu$=1.8×$10^{-5}$ (air viscosity), K=1.38×$10^{-23}$ (Boltzmann's constant), T: absolute temperature, $d_p$: object particle diameter, u: measured air speed, $\alpha$: packing ratio, $\sigma$: variance in fiber diameter.

[Actual Single Fiber Collection Efficiency of PTFE Porous Film]

The actual single fiber collection efficiency $\eta$ was obtained by means of the formula shown below, which is from the general single fiber collection theorem and the performance values of a PTFE porous film.

$\eta$=−ln P/$\Delta$p/(−0.5 ln $\alpha$'−0.52+0.64$\alpha$'+1.43(1−$\alpha$')Kn)× 4$\pi\mu u$(1−$\alpha$)/$d_f$ [Formula 11]

Here, P: actual measured permeability (%)/100, ΔP: actual measured pressure loss (Pa)

[Pressure Loss (Pa) of an Air Filter Unit]

Figure 10:
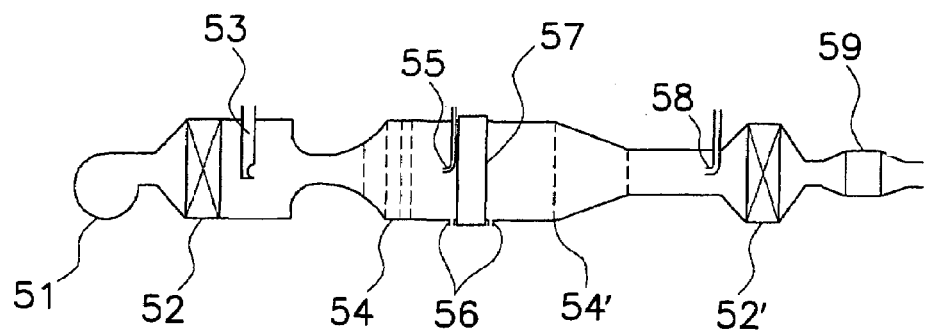
FIG. 10 shows a device which measures the pressure loss of an air filter unit.

A device shown in FIG. 10 was employed, an air filter unit was mounted thereto, the rate at which an air flow permeated the filter medium was adjusted to 1.4 cm/sec, and the pressure loss before and after the air filter unit at that time was measured with a manometer.

Note that in FIG. 10, 51 is a fan, 52, 52' are HEPA filters, 53 is a particle introduction tube, 54, 54' are straightening vanes, 55 is an upstream particle sampling tube, 56 is a static pressure measuring hole, 57 is an air filter unit to be tested, 58 is a downstream particle sampling tube, and 59 is a laminar flow type flow meter.

[Collection Efficiency (%) of an Air Filter Unit]

The device shown in FIG. 10 was used, an air filter unit was mounted thereto, and the rate at which an air flow permeated the filter medium was adjusted to 1.4 cm/sec. In this state, silica particles having a particle size of 0.1 to 0.12 micrometers and a particle concentration of $1\times10^9/\text{ft}^3$ flowed from the upstream side, and the number of particles having a particle size of 0.1 to 0.12 micrometers on the downstream side were counted with a particle counter. The ratio of the number of particles between the upstream side and the downstream side was determined. In other words, when the particle concentration on the upstream side of an air filter unit was represented by Ci and the particle concentration on the downstream side of the air filter unit was represented by Co, the collection efficiency of the air filter unit was calculated by the following formula:

Collection efficiency (%)=(1−Co/Ci)×100    [Formula 12]

[Permeability (%) of an Air Filter Unit]

The permeability of air filter unit was obtained by the following formula:

Permeability (%)=100−collection efficiency (%)    [Formula 13]

[PF Value of an Air Filter Unit]

The $PF_2$ values of the air filter units were obtained by inserting the pressure loss and permeability of the air filter units into the following formula:

$PF_2$ value=[−log(permeability (%)/100)/(pressure loss (Pa)]×1000    [Formula 14]

[Average Pore Diameter of Homo- and Modified PTFE Porous Film]

Pore Diameters of Homo-PTFE Porous Film

Because the pore diameters of the homo-PTFE porous film are smaller than the pore diameters of the modified PTFE porous film, the mean flow pore size (MFP) measured in accordance with ASTM F-316-86 was used as the average pore diameter of the PTFE porous films. The actual measurements were conducted with a Coulter Porometer [produced by Coulter Electronics Corp. (United Kingdom)].

Pore Diameters of Modified PTFE Porous Film

The pore diameters of the modified PTFE porous films were determined by photographing the modified PTFE porous film of the multi-layer PTFE porous films with a scanning electron microscope or an optical microscope, such that 20 PTFE fibers were in the field of view when viewed from directly above. This photograph was enlarged into a quarter, 4 straight lines of equal length were drawn on the photograph 5 cm apart in both the vertical and horizontal directions, the distances between the PTFE fibers above these lines was measured, and the pore diameter of the modified PTFE porous film layer of the present invention was obtained by taking the average of these distances.

INDUSTRIAL APPLICABILITY

According to the present invention, a PTFE porous film having a low packing ratio and a PF value that exceeds 32 can be obtained by mixing a predetermined ratio or greater of a liquid lubricant with a PTFE fine powder. By using this PTFE porous film, a high performance filter medium, filter pack, and air filter unit can be obtained.

In addition, according to the present invention, the distance between the fibers in an interface area of a porous film that serves as a collection layer in a multi-layer porous film will be increased by elongation, because the porous film that serves as the collection layer is laminated to a porous film that has a different average pore density. As a result, the single fiber collection efficiency thereof will increase, and thus a multi-layer porous film having a sharply higher PF value will be obtained. By using this PTFE porous film, a high performance filter medium, filter pack, and air filter unit can be obtained.

The invention claimed is:

1. A method of producing a filter medium having a three layer structure comprised of a porous film comprised of polytetrafluoroethylene and air permeable support members comprised of a heat fusible non-woven fabric, wherein a PF value of the filter medium exceeds 32 and is computed in accordance with the following formula from a pressure loss measured when air permeates the filter medium at a flow rate of 5.3 cm/s and a collection efficiency measured by employing silica particles having diameters between 0.10 and 0.12 micrometers PF=[−log(permeability (%)/100)/(pressure loss (Pa)]×1000 wherein permeability (%)=100−collection efficiency (%), the method comprising:
  a first step in which 380 ml or more of a liquid lubricant at 20° C. is mixed per 1 kg of a polytetrafluoroethylene fine powder to obtain a compound;
  a second step in which the compound is rolled and the liquid lubricant therein removed to obtain a non-sintered tape;
  a third step in which the non-sintered tape is elongated to obtain the porous film; and
  a fourth step in which each of the air permeable support members is heat laminated to opposite surfaces of the porous film by their own weight and without the application of additional pressure or compression in a thickness direction thereby producing the three layer structure of the filter medium.

2. The method of producing the filter medium set forth in claim 1, in which 406 ml or more of a liquid lubricant at 20° C. is mixed per each 1 kg of polytetrafluoroethylene fine powder in the first step thereof.

3. The method of producing the filter medium set forth in claim 1, wherein in the third step the total area of the non-sintered tape is elongated to between 80 times and 800 times its original size by first elongating the non-sintered tape in the longitudinal direction between 3 times and 20 times its original length and then elongating the non-sintered tape in the lateral direction between 10 and 50 times its original width.

* * * * *